United States Patent
Reial

(10) Patent No.: US 8,767,895 B2
(45) Date of Patent: Jul. 1, 2014

(54) INTERFERENCE CANCELLATION BASED ON INTERFERING LINK IL SIGNAL QUALITY AND RELATED METHODS AND DEVICES

(75) Inventor: Andres Reial, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 356 days.

(21) Appl. No.: 13/165,090

(22) Filed: Jun. 21, 2011

(65) Prior Publication Data

US 2012/0189083 A1    Jul. 26, 2012

Related U.S. Application Data

(60) Provisional application No. 61/435,849, filed on Jan. 25, 2011.

(51) Int. Cl.
H04L 1/00 (2006.01)

(52) U.S. Cl.
USPC ........... 375/346; 375/144; 375/148; 375/349; 375/350; 375/351; 455/63.1; 455/296; 455/303; 455/501

(58) Field of Classification Search
CPC ........ H04B 1/10; H04B 1/1027; H04B 1/109; H04B 1/12; H04B 1/123; H04B 15/00; H04B 1/1036; H04B 1/0475; H04B 17/005; H04B 17/006; H04B 1/7097; H04B 1/71; H04B 1/7107; H04W 52/243; H04W 28/048; H04L 25/08; H04J 11/0023; H04J 11/005
USPC ................. 375/144, 346, 349, 350, 351, 148; 455/63.1, 296, 303, 307, 501
See application file for complete search history.

(56) References Cited

U.S. PATENT DOCUMENTS

| 6,122,309 A * | 9/2000 | Bergstrom et al. ........... 375/130 |
| 6,901,243 B2 * | 5/2005 | Jayaraman et al. .......... 455/63.1 |

(Continued)

FOREIGN PATENT DOCUMENTS

WO    WO 2007/021906 A2    2/2007

OTHER PUBLICATIONS

International Search Report Corresponding to International Application No. PCT/SE2012/050055; Date of Mailing: May 3, 2012; 14 Pages.

Pouttu, A. et al., "Effects of Rayleigh Fading to Method-Selection in Interference Suppression", *IEEE Military Communications Conference*, 2005. vol. 2, pp. 1225-1230, Oct. 17-20, 2005.

(Continued)

Primary Examiner — Sophia Vlahos
(74) Attorney, Agent, or Firm — Myers Bigel Sibley & Sajovec, P.A.

(57) ABSTRACT

A target link signal may be received at a receiving device with the target link signal being received in a received signal also including an interfering link signal. A quality of the interfering link signal in the received signal may be estimated at the receiving device to provide an estimated interfering link signal quality. One of a plurality of interference cancellation techniques may be selected responsive to the estimated interfering link signal quality, and an interference cancellation signal may be generated using the selected one of the plurality of interference cancellation techniques. Information of the interference cancellation signal may be incorporated in the received signal. Responsive to incorporating information of the interference cancellation signal in the received signal, the received signal may be demodulated to provide a demodulated target link signal, and the demodulated target link signal may be decoded to provide a target link bit stream.

24 Claims, 10 Drawing Sheets

(56) References Cited

U.S. PATENT DOCUMENTS

| | | | |
|---|---|---|---|
| 7,006,811 B2* | 2/2006 | Pukkila | 455/278.1 |
| 7,437,135 B2* | 10/2008 | Pan et al. | 455/284 |
| 7,697,645 B2* | 4/2010 | Jong | 375/346 |
| 7,724,816 B2* | 5/2010 | Chen et al. | 375/231 |
| 7,881,711 B2* | 2/2011 | Lundby | 455/422.1 |
| 8,355,474 B2* | 1/2013 | De Carvalho et al. | 375/347 |
| 2003/0202568 A1 | 10/2003 | Choi et al. | |
| 2004/0171364 A1 | 9/2004 | Pukkila | |
| 2006/0120436 A1 | 6/2006 | Komatsu | |
| 2007/0058709 A1 | 3/2007 | Chen et al. | |
| 2007/0183544 A1 | 8/2007 | Lee et al. | |
| 2008/0248773 A1* | 10/2008 | De Carvalho et al. | 455/278.1 |
| 2010/0284443 A1 | 11/2010 | Rosenqvist et al. | |
| 2010/0303182 A1* | 12/2010 | Daneshrad et al. | 375/346 |
| 2011/0206167 A1 | 8/2011 | Rosenqvist et al. | |

OTHER PUBLICATIONS

Pouttu, A. et al., "Synchronization of FH/DS Signal with Interference Suppression Diversity", *2006 IEEE Ninth International Symposium on Spread Spectrum Techniques and Applications,* Aug. 28-31, 2006, pp. 69-73.

Zhao et al. "Hybrid Hard/Soft Interference Cancellation Based on List Viterbi Decoding" *IEEE Conference Record of the Thirty-Ninth Asilomar Conference on Signals, Systems and Computers,* pp. 839-842, 2005.

Agarwal et al. "A Reduced Complexity hybrid switched mode detector using interference cancellation methods for DS-CDMA systems" *IEEE Annual India Conference,* pp. 1-4, 2006.

International Preliminary Report on Patentability corresponding to PCT Application No. PCT/SE2012/050055, Date of Completion: Feb. 15, 2013.

* cited by examiner

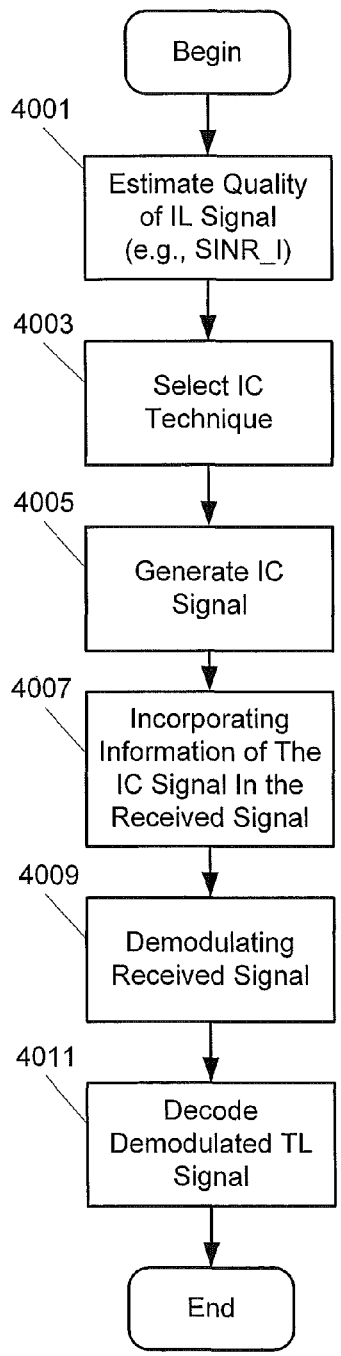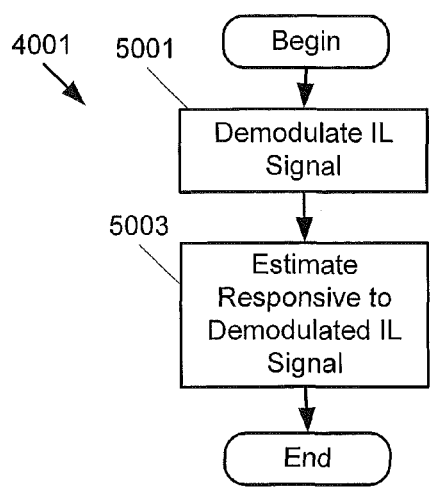

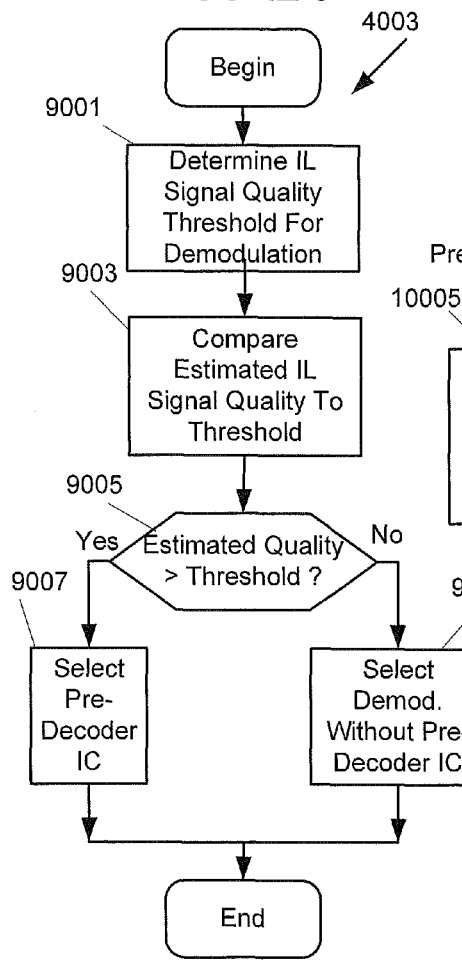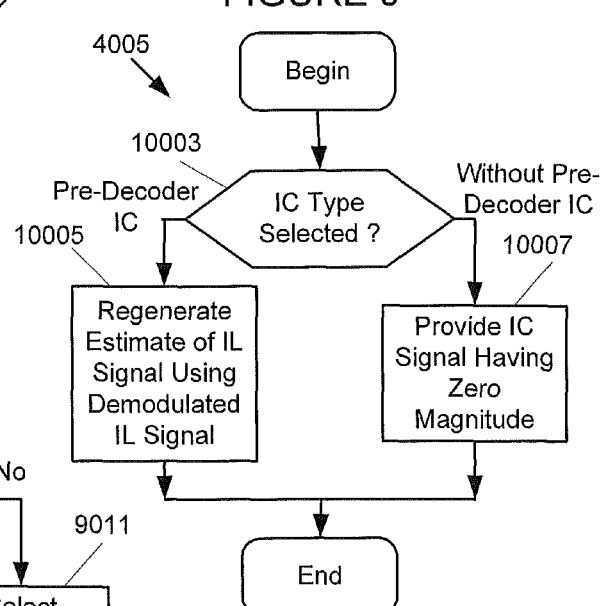

INTERFERENCE CANCELLATION BASED ON INTERFERING LINK IL SIGNAL QUALITY AND RELATED METHODS AND DEVICES

RELATED APPLICATION

The present application claims the benefit of priority of U.S. Application No. 61/435,849 filed Jan. 25, 2011, the disclosure of which is hereby incorporated herein in its entirety by reference.

TECHNICAL FIELD

The present disclosure is directed to network communications and, more particularly, to wireless communications using interference cancellation.

BACKGROUND

In a typical wireless communications network such as a cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

In such a communications network, a data rate that can be supported over a target link TL between a base station and a wireless terminal may be limited by interference from other sources. As shown in FIG. 1A, for example, base station 19a may receive uplink communications from wireless terminals 11a and 15a. In receiving the uplink communications from wireless terminal 11a (referred to as a target link TL) at a receiver of base station 19a, uplink communications from another wireless terminal 15a (referred to as an interfering link IL) may interfere with reception of the uplink communications from wireless terminal 11a. As shown in FIG. 1B, base station 19b-1 may transmit downlink communications to wireless terminal 11b, and base station 19b-2 may transmit downlink communications to wireless terminal 15b. In receiving downlink communications from base station 19-1b at a receiver of wireless terminal 11b (referred to as a target link TL), downlink communications from base station 19b-2 to wireless terminal 15b (referred to as an interfering link IL) may interfere with reception of the downlink communications from base station 119b-1 to wireless terminal 11b (the dashed line in FIG. 1B indicates the interfering link as perceived/received at wireless terminal 11b). As shown in FIG. 1C, base station 19c may transmit downlink communications to wireless terminals 11c and 15c. In receiving downlink communications from base station 19c at a receiver of wireless terminal 11c (referred to as a target link TL), downlink communications from base station 19c to wireless terminal 15c as (referred to as an interfering link IL) may interfere with reception of the downlink communications from base station 119c to wireless terminal 11c (the dashed line in FIG. 1C indicates the interfering link as perceived/received at wireless terminal 11c).

In any of the examples of FIGS. 1A, 1B, and/or 1C, a received signal at a target link TL receiver (at a wireless terminal or at a base station) may include a target link TL with information intended for the target link TL receiver and one or more interfering link IL or links. A ratio of received signal power of the target link TL to a received signal power of an interfering link IL or links (as received at the target link TL receiver attempting to receive the target link) plus other noise and interference, may be referred to as a geometry factor. The geometry factor may be a significant factor determining an achievable data rate for the target link. Stated in other words, a greater geometry factor (i.e., a greater ratio of target link TL signal strength to interfering link IL signal strength at the target link TL receiver) may allow a greater data rate to be transmitted over the target link TL to the target link TL receiver than a lower geometry factor (i.e., a lower ratio of target link TL signal strength to interfering link IL signal strength at the target link TL receiver). By reducing an effective power of an interfering link IL at a receiver (which may result from traffic data transmissions), an effective geometry factor for the target link TL at the receiver may be increased/improved, thereby improving receiver performance and/or allowing increased data rates. An effective power of an interfering link IL, for example, may be reduced using linear suppression, pre-decoder interference cancellation, or post-decoder interference cancellation.

With linear suppression, the target link TL receiver may include multiple receiver (RX) antennas, and an antenna lobe diagram may be steered so as to point a spatial null in an arrival direction of a dominant source of interference. Statistics of the received signal may be used to determine combining weights leading to the desired spatial pattern, e.g., using Interference Rejection Combining (IRC) to provide improved Signal-to-Interference-and-Noise Ratio (SINR).

To significantly suppress the interfering link IL with a 2-antenna receiver, the interfering link IL should arrive from a well defined single direction. In dispersive environments where several reflections from different directions may contribute, however, null steering may not be effective. Moreover, if the null steering degree of freedom is used to suppress the interfering link IL, this degree of freedom may no longer be available for spatial InterSymbol Interference ISI suppression or inter-stream interference suppression in multiple-input, multiple-output (MIMO) transmissions on the target link TL, thus significantly lowering the equalization efficiency.

With pre-decoder interference cancellation, the receiver may demodulate the interfering link IL from a received signal and apply hard decisions to the symbol estimates resulting from the demodulation to reconstruct the transmitted symbol sequence. The reconstructed symbol sequence for the interfering link IL may be filtered with the channel and subtracted from the received signal. After that, the desired target link TL signal may be demodulated and decoded from the received signal. By providing interference cancellation, the target link TL signal may be demodulated and decoded with higher quality than without interference cancellation.

Pre-decoder interference cancellation may be effective when the raw symbol SINR of the interfering link IL at the target receiver is sufficiently high to make reliable hard decisions. If the raw symbols of the interfering link IL are not sufficiently reliable, however, applying hard decisions may lead to significant decision errors and to interference amplification instead of cancellation.

With post-decoder interference cancellation, the receiver may demodulate and decode the interfering link IL from a received signal. The resulting decoded bit sequence for the interfering link IL may then be re-encoded, and the coded bits may be passed through a modulator to reconstruct the transmitted symbol sequence for the interfering link IL. The reconstructed sequence may then be filtered with the channel and subtracted from the received signal. After that, the desired target link TL signal may be demodulated and decoded from the received signal. By providing interference cancellation, the target link TL signal may be demodulated and decoded with higher quality than without interference cancellation.

Post-decoder interference cancellation may be effective when the Modulation and Coding Scheme MCS applied to the interfering link IL is sufficiently conservative (with e.g., sufficiently low code rate) for the TL receiver to be able to demodulate and decode. If radio conditions of the interfering link IL between the interfering link IL transmitter and the intended interfering link IL receiver are better than radio conditions of the interfering link IL between the interfering link IL transmitter and the target link TL receiver, the target link TL receiver may not be able to successfully decode the interfering link IL transport block. This situation may be detected using error detection/correction (such as a Cyclic Redundancy Check or CRC) and any degradation due to incorrect IC feedback may be avoided, but no target link TL geometry improvement will be achieved.

Each of the interference cancellation techniques discussed above may thus be unable to provide a high level of interference cancellation over a full range of varying radio conditions.

SUMMARY

According to some embodiments, a target link signal may be received at a receiving device with the target link signal being received in a received signal also including an interfering link signal. A quality of the interfering link signal in the received signal may be estimated at the receiving device (2001) to provide an estimated interfering link signal quality, and one of a plurality of interference cancellation techniques may be selected responsive to the estimated interfering link signal quality. An interference cancellation signal may be generated using the selected one of the plurality of interference cancellation techniques, and information of the interference cancellation signal may be incorporated in the received signal. Responsive to incorporating information of the interference cancellation signal in the received signal, the received signal may be demodulated to provide a demodulated target link signal, and the demodulated target link signal may be decoded to provide a target link bit stream.

Receiver performance may thus be improved by changing techniques of interference cancellation responsive to changes in the interfering link signal quality. Stated in other words, different techniques of interference cancellation may be used by a receiver at different times to match changes in interfering link signals present at the receiver.

According to some other embodiments, a receiver may be configured to receive a target link signal with the target link signal being received in a received signal also including an interfering link signal. The receiver may include an interfering link estimator, a demodulator, and a decoder. The interfering link estimator may be configured to estimate a quality of the interfering link signal in the received signal to provide an estimated interfering link signal quality, configured to select one of a plurality of interference cancellation techniques responsive to the estimated interfering link signal quality, and configured to generate an interference cancellation signal using the selected one of the plurality of interference cancellation techniques. The demodulator may be configured to incorporate information of the interference cancellation signal in the received signal and to demodulate the received signal to provide a demodulated target link signal. The decoder may be configured to decode the demodulated target link signal to provide a target link bit stream.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 4-16 are flow charts illustrating operations of receivers according to some embodiments of FIG. 3.

DETAILED DESCRIPTION

Figure 1A:
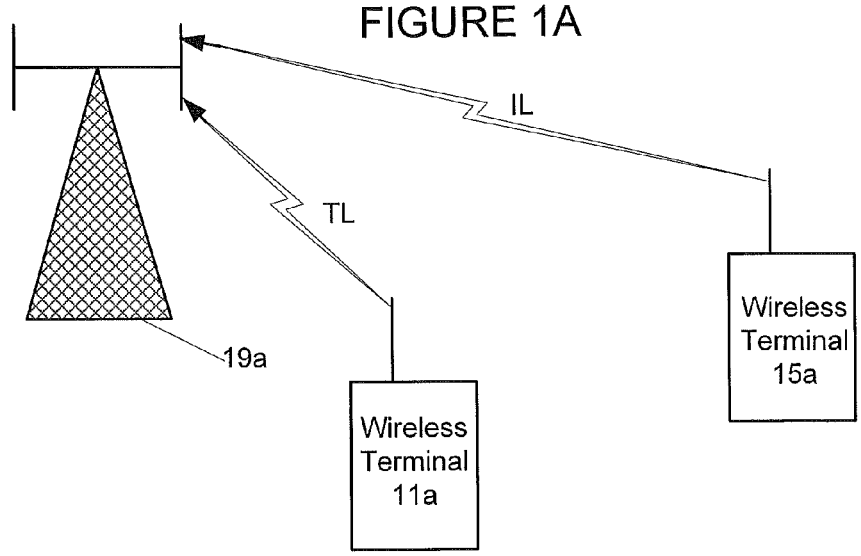
FIGS. 1A, 1B, and 1C are schematic diagrams illustrating interference sources of communication systems.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), GSM (Global System for Mobile Communications), and HSPA (High-Speed Packet Access), may also benefit from exploiting embodiments of the present invention disclosed herein.

Also note that terminology such as base station (also referred to as NodeB, eNodeB, or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel While embodiments discussed herein may focus on wireless transmissions in a downlink from an eNodeB to a UE, embodiments of the invention may also be applied, for example, in the uplink.

Such communications systems may support voice radiotelephone communications and/or packet data communications (e.g., according to the HSPA and/or LTE standards). With data communications, a target link TL may represent transmissions from a target link TL source to a target link TL receiver, and an interfering link IL may represent transmissions from an interfering link IL source to an interfering link IL receiver wherein the target link and interfering link sources are different and/or the target and interfering link receivers are different. More particularly, the target and interfering link sources may be part of a same communications system, and/ or the target and interfering link receivers may be part of a same communications system. For example, an interfering link IL may represent: transmissions from an interfering link IL source to the target link TL receiver as discussed above with respect to FIG. 1A; transmissions from an interfering link IL source to an interfering link IL receiver as discussed above with respect to FIG. 1B; and/or transmissions from the target link TL source to an interfering link IL receiver as discussed above with respect to FIG. 1C.

Figure 2:
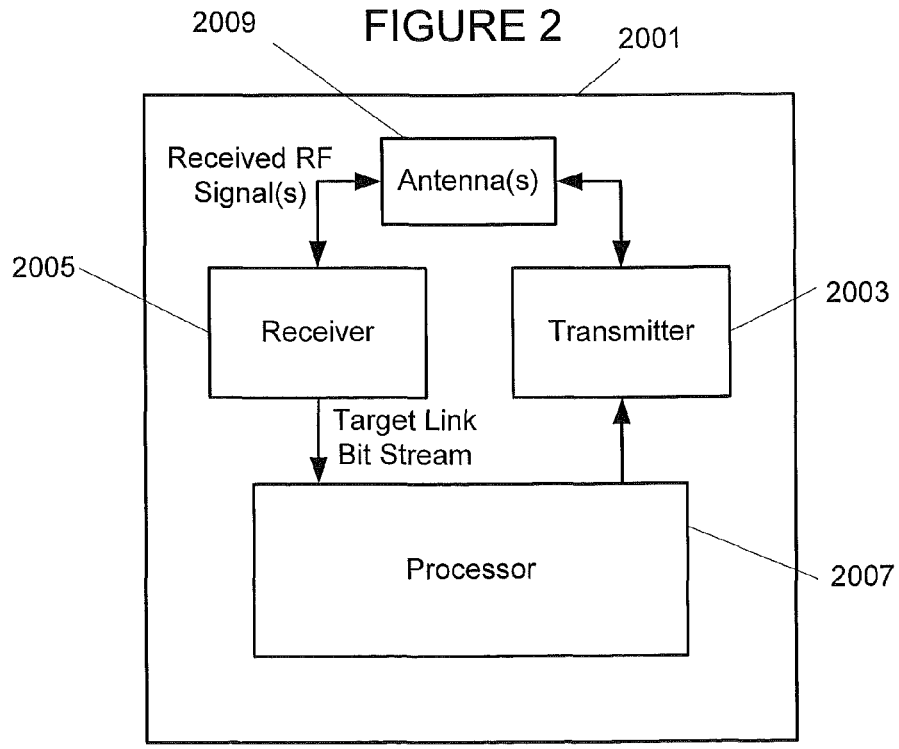
FIG. 2 is a block diagram of a communications device according to some embodiments.

As shown in FIG. 2, a radio communications device 2001 according to some embodiments may include transmitter 2003, receiver 2005, processor 2007, and/or antenna(s) 2009. For received communications, receiver 2005 may be configured to generate a received bit stream responsive to received RF (radio frequency) signals from antenna(s), and processor 2007 (also referred to as a processing circuit) may be configured to process this target link TL bit stream to reconstruct communications (e.g., voice and/or data communications) from a remote party. For transmitted communications, processor 2007 may generate a transmitted bit stream (representing voice and/or data communications), and transmitter 2003 may be configured to modulate and transmit this bit stream through antenna(s) 2009 over a radio frequency channel.

Radio communications device 2001, for example, may be implemented as a mobile wireless terminal and/or as a base station. With radio communications device 2001 provided as a mobile wireless terminal, radio communications device 2001 may include a user interface (allowing tactile/audio/ video user input and/or providing visual/audio output) coupled to processor 2007, and the user interface may include a keypad, a display, a touch sensitive display, a touch pad, a track ball, a joy stick, a speaker, a microphone, a photo/video camera, etc. With radio communications device 2001 provided as a base station, processor 2007 may be coupled to a base station controller and/or a mobile switching center, and processor 2007 may thus support a communications link (through antenna 2009, transmitter 2003, and/or receiver 2005) between one or more mobile wireless terminals in a coverage area (or cell) of communications device 2001 and remote communications devices (e.g., servers, conventional telephones, other wireless terminals in the same or other coverage areas, etc.).

Figure 1B:
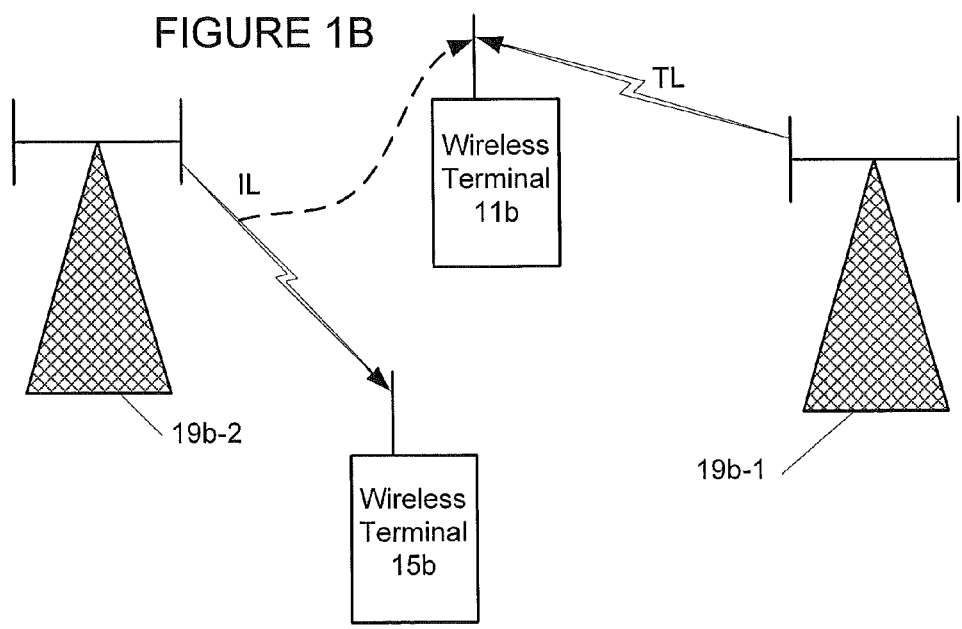
Figure 1C:
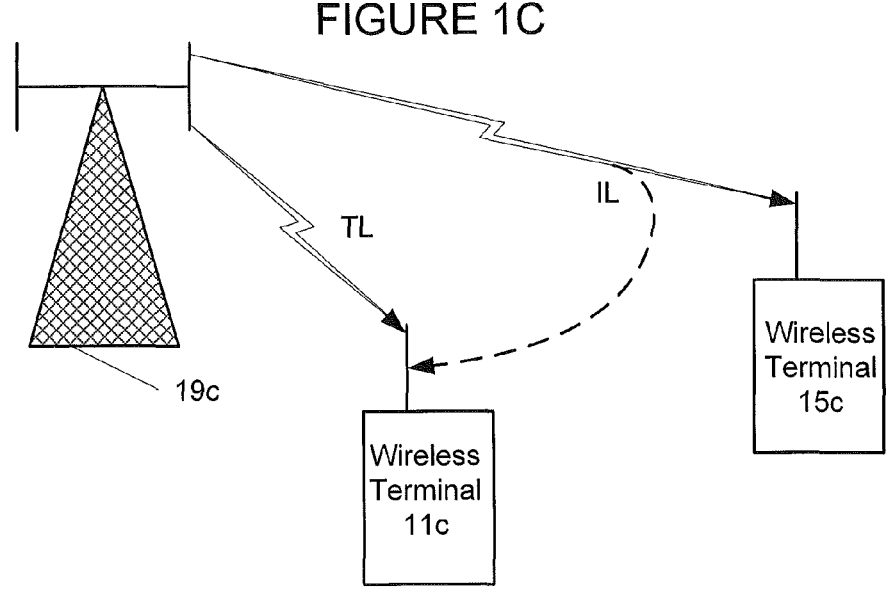

Whether radio communications device 2001 is implemented as a mobile wireless terminal or as a base station, receiver 2005 may be configured to generate a target link TL bit stream corresponding to signals received over an RF target link TL from a remote communications device. If radio communications device 2001 is a mobile wireless terminal, receiver 2005 may be configured to generate the target link TL bit stream responsive to downlink signals received over a target link TL transmitted from a target link TL base station at communications device 2001, and an interfering link IL(s) may be transmitted by a different interfering link IL base station(s) of the same system to another wireless terminal as shown in FIG. 1B, by the same base station to a different wireless terminal as shown in FIG. 1C, and/or by other wireless terminals. If radio communications device 2001 is a base station, receiver 2005 may be configured to generate the target link TL bit stream responsive to uplink signals received over a target link TL transmitted from a target link TL wireless terminal, and an interfering link IL(s) may be transmitted by a different wireless terminal as shown in FIG. 1A, and/or by a different base station of the same communications system. As discussed in greater detail below, receiver 2005 (also referred to as target receiver 2005) may be configured to reduce an effective power of an interfering link IL signal or signals (as perceived/received at target receiver 2005) to improve reception of a target link TL signal thereby improving a quality and/or data rate of a target link TL bit stream. By reducing an effective power of an interfering link IL signal (as perceived/received at target receiver 2005), for example, receiver 2005 (acting as a target link TL receiving device) may support an increased data rate for a target link TL signal received from a remote communications device (acting as a target link TL transmitting device).

As discussed herein, target and interfering link signals may provide voice and/or data communications between respective wireless terminals and base stations. According to some embodiments, target and interfering link signals may be data communications according to the High Speed Packet Access HSPA standard. In the downlink, for example, target and interfering link signals may be transmitted from a same or different base station(s) to respective wireless terminals according to the High Speed Downlink Packet Access HSDPA standard.

Figure 3:
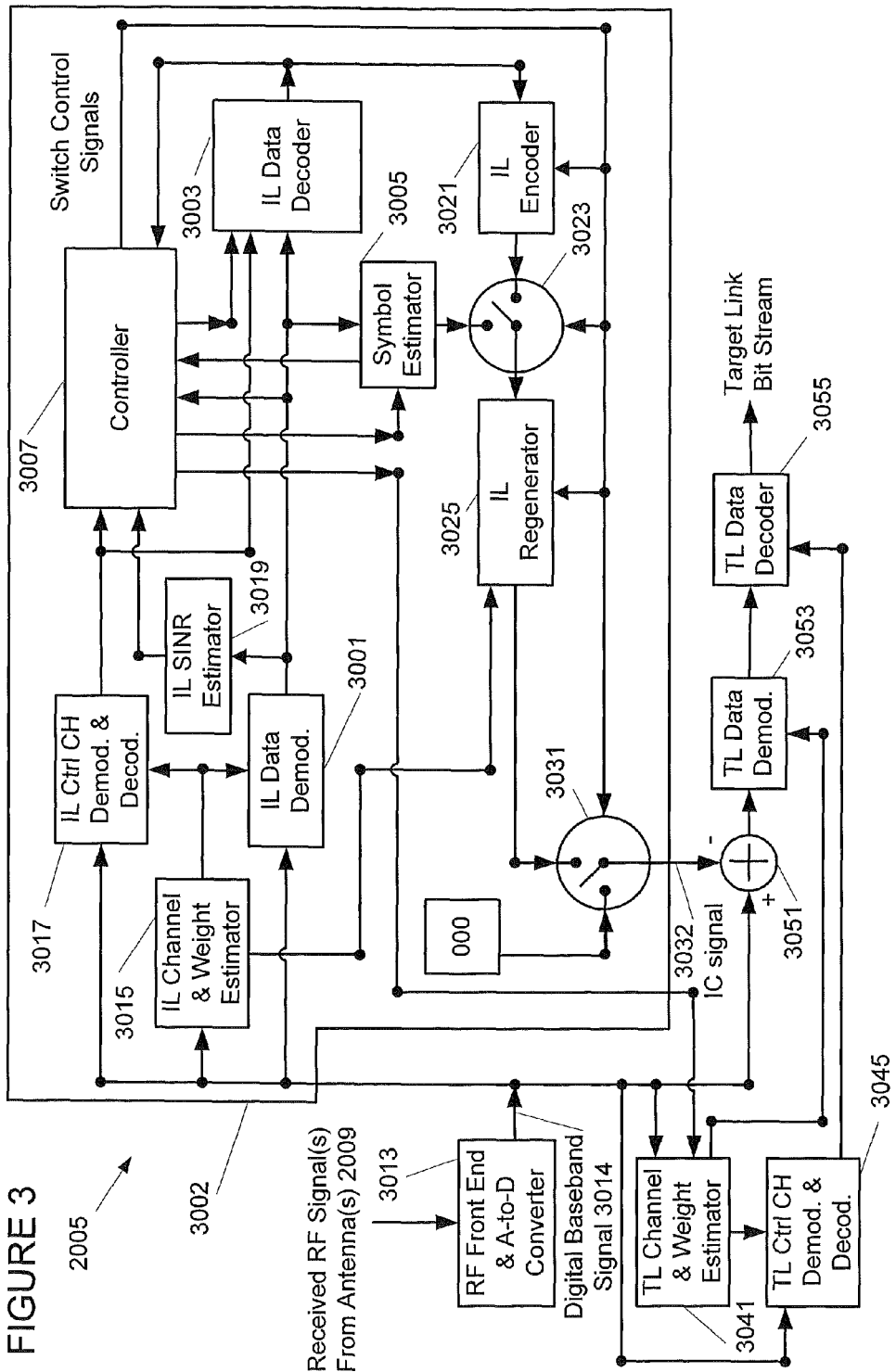
FIG. 3 is a block diagram illustrating a receiver of the communications device of FIG. 2 according to some embodiments.

As shown in FIG. 3, receiver 2005 may include radio frequency front end and Analog-to-Digital (A-to-D) converter 3013, interfering link IL estimator 3002, target link TL channel and weight estimator 3041, target link TL control channel demodulator and decoder 3045, combiner 3051, target link TL data demodulator 3053, and target link TL decoder 3055. In summary, RF front end and A-to-D converter 3013 may be configured to generate digital baseband signal 3014 responsive to RF signals received through antenna(s) 2009 of FIG. 2, and interfering link IL estimator 3002 may be configured to generate an interference cancellation IC signal 3032 representing an interfering link IL signal (as perceived/received at target receiver 2005) responsive to the digital baseband signal 3014. More particular, interfering link IL estimator 3002 may be configured to estimate a quality of the interfering link IL signal (as perceived/received at target receiver 2005), and to select one of a plurality of different interference cancellation IC techniques responsive to the estimated quality of the interfering link IL signal (as perceived/received at target receiver 2005).

Target link TL data demodulator 3053 may be configured to incorporate information of the interference cancellation IC signal 3032 with the digital baseband signal 3014 when demodulating the digital baseband signal to generate a demodulated target link TL signal. According to some embodiments, combiner 3031 may be configured to incorporate information of the interference cancellation IC signal 3032 in the received digital baseband signal 3014 by combining the interference cancellation signal 3032 and the received digital baseband signal 3014 to provide an interference reduced target link TL digital base band signal, and target link TL data demodulator 3053 may be configured to demodulate the interference reduced target link TL digital baseband signal to provide the demodulated target link TL signal. Accordingly, the interference cancellation signal 3032 may be combined with (e.g., subtracted from) the received digital baseband signal 3014 using combiner 3051 to reduce a strength of the interfering link IL signal (as perceived/received at target receiver 2005) in the received digital base band signal 3014. While combiner 3051 and target link TL data demodulator 3053 are shown as separate elements, combiner 3051 and target link TL data demodulator 3053 and/or elements thereof may be combined. Accordingly to other embodiments, information of the interference cancellation signal 3032 may be incorporated in the digital baseband signal 3014 by modifying demodulator metrics (for target link data demodulator 3053) responsive to the interference cancellation signal 3032, and target link TL data demodulator 3053 may be configured to demodulate the received digital baseband signal using the modified demodulator metrics. The interference cancellation signal 3032, for example, may be used by target link TL channel and weight estimator 3041 to provide an improved estimate(s) of the target link TL channel and/or weights used by target link TL data demodulator 3053.

The resulting demodulated target link TL signal may then be decoded using target link TL decoder 3055 to generate the target link TL bit stream that is provided to processor 2007. In addition, target link TL channel and weight estimator 3041 may be configured to provide estimates of the target link TL channel and/or weights, and these estimates may be provided to target link TL data demodulator 3053 and/or to target link TL control channel demodulator and decoder 3045 to facilitate more accurate demodulation. Target link TL control channel demodulator and decoder 3045 may be configured to demodulate and decode a target link TL control channel (transmitted from the target link TL transmitter) to determine a modulation and coding scheme MCS for the target link TL that may be used by decoder 3055 to decode the target link TL bit stream. If communication device 2001 is a wireless terminal and the target and interfering link signals are High Speed Downlink Data Channel (HS-PDSCH) signals according to the HSDPA standard, for example, the target link TL control channel may be a High Speed Shared Control Channel HS-SCCH transmitted by the same base station that transmits the target link TL signal.

Interfering link IL estimator 3002, for example, may be configured to estimate a quality of the interfering link IL signal (as perceived/received by target receiver 2005) in the received digital baseband signal 3014 to provide an estimated interfering link IL signal quality (as perceived/received at target receiver 2005), to select one of a plurality of interference cancellation techniques responsive to the estimated interfering link IL signal quality, and to generate interference cancellation IC signal 3032 using the selected one of the interference cancellation techniques (also referred to as interference cancellation IC modes). Interfering link IL estimator 3002, for example, may be configured to select one of pre-decoder IC, Post-decoder IC, linear suppression, and/or no IC responsive to the estimated interfering link IL signal quality. Performance of receiver 2005 may thus be improved by changing techniques of interference cancellation responsive to changes in the interfering link IL signal quality (as perceived/received at target receiver 2005). Stated in other words, different techniques of interference cancellation may be used by receiver 2005 at different times to match changes in interfering link IL signals (as perceived/received at target receiver 2005).

As shown in FIG. 3, interfering link IL estimator 3002 may include interfering link IL channel and weight estimator 3015 that is configured to estimate the channel and weights for the interfering link IL signal as received/perceived at receiver 2005 responsive to received digital baseband signal 3014. The estimated channel and/or weights may be provided to interfering link IL data demodulator 3001 and to interfering link IL control channel demodulator and decoder 3017. Interfering link IL control channel demodulator and decoder 3017 may thus demodulate and decode a control channel from the interfering link IL transmitter (responsive to digital baseband signal 3014 and using the estimated channel and weights from interfering link IL channel and weight estimator 3015) to provide a modulation and coding scheme MCS (e.g., including modulation and transport block size information) for the interfering link IL signal to controller 3007 and to interfering link IL data decoder 3003. If communication device 2001 is a wireless terminal and the target and interfering link signals are downlink signals according to the HSDPA standard, for example, the interfering link IL control channel may be a High Speed Shared Control Channel HS-SCCH transmitted by the same base station that transmits the interfering link IL signal.

Similarly, interfering link IL data demodulator 3001 may be configured to demodulate the interfering link IL signal (using the estimated channel and weights from interfering link IL channel and weight estimator 3015) to provide a demodulated interfering link IL signal. Interfering link IL data demodulator 3001 and/or IL channel and weight estimator 3015 may thus demodulate the received digital base band signal 3014 (using estimates of the IL channel and/or weights as perceived/received at target receiver 2005) to provide data symbols for the interfering link signal, for example, using linear receiver techniques (e.g., using Generalized RAKE receiver techniques, Linear Minimum Mean Squared Error or LMMSE receiver techniques, chip equalizer receiver techniques, Frequency-Domain Equalization or FDE receiver techniques, etc.). Using linear receiver techniques, for example, delay and channel estimation may be performed on the interfering link signal (as perceived/received at target receiver 2005), followed by conventional weight computation, weight application, and/or dispreading (where the order of weight application and dispreading may be reversed).

In addition, interfering link IL SINR (signal-to-interference-and-noise ratio) estimator 3019 may be configured to estimate a quality (e.g., SINR_I) of the interfering link IL signal (as perceived/received at target receiver 2005) responsive to the demodulated interfering link IL signal (e.g., interfering link symbols) generated by interfering link IL data demodulator 3001. Interfering link IL SINR estimator 3019 and/or controller 3007, for example, may estimate the quality of the interfering link IL signal (e.g., SINR_I) as perceived/received at target receiver 2005 using a pilot component of the interfering link IL signal and/or using data symbols provided by interfering link data demodulator 3001.

A relatively high SINR for the interfering link IL signal (as perceived/received at target receiver 2005) may indicate that the interfering link IL signal may be received at target receiver 2005 at a relatively high quality, while a relatively low SINR for the interfering link IL signal may indicate that the interfering link IL signal may be received at target receiver 2005 at relatively low quality. With a relatively high SINR for the interfering link IL signal (as perceived/received at target receiver 2005), the interfering link IL signal may be a relatively strong interferer with respect to the target link TL signal, but interfering link IL estimator 3002 may be able to more accurately reproduce the interfering link IL signal to provide improved cancellation thereof. With a relatively low SINR for the interfering link IL signal (as perceived/received at target receiver 2005), interfering link IL estimator 3002 may be less accurate in reproducing the interfering link IL signal so that less accurate interference cancellation is provided, but an interfering link IL signal with a relatively low SINR_may be a relatively weak interferer with respect to the target link TL signal so that less accurate interference cancellation may be acceptable.

Controller 3007, for example, may be configured to select a technique for interference cancellation responsive (at least in part) to the estimate of the quality of the interfering link IL signal (e.g., SINR_I) generated by the interfering link IL SINR estimator 3019. For example, controller 3007 may be configured to determine an interfering link IL signal quality threshold for decoding (e.g., SINR_d) the interfering link IL signal, and to compare the estimated interfering link IL signal quality (e.g., SINR_I) as perceived/received at target receiver 2005 with the interfering link IL signal quality threshold (e.g., SINR_d). Controller 3007 may be further configured to select a first one of a plurality of interference cancellation techniques responsive to the estimated interfering link IL signal quality (as perceived/received at target receiver 2005) exceeding the threshold for decoding (e.g., SINR_I>SINR_d), and to select a second one of the plurality of interference cancellation techniques responsive to the estimated interfering link IL signal quality (as perceived/received at target receiver 2005) being less than the threshold for decoding (e.g., SINR_I<SINR_d). As noted above, interfering link IL control channel demodulator and decoder 3017 may be configured to demodulate and decode a control channel associated with the interfering link IL signal (e.g., an HS-SCCH control channel for a base station transmitting the interfering link IL signal), and to provide a modulation and coding scheme MCS (e.g., including modulation and transport block size information) for the interfering link IL signal. Accordingly, controller 3007 may be configured to determine the interfering link IL signal quality threshold for decoding (e.g., SINR_d) using information from the modulation and coding scheme (MCS) and/or lookup tables. More particularly, SINR_d may be fetched from a pre-computed lookup table indexed by information obtained/derived from the interfering link control channel (e.g., modulation, code rate, etc.). As used herein, SINR_d may be defined as a least or minimum SINR for the interfering link signal (as perceived/received at target receiver 2005) providing a reasonably high probability of successfully decoding the interfering link IL signal so that the resulting decoded output passes error detection/correction (e.g., CRC). Instead of hard decoded information bits, the decoder output may also be improved soft values for the coded bits, used to form soft symbol estimates, in which case the SINR_d may be defined as a least SINR for the interfering link signal for which the decoder is able to improve the soft value quality significantly.

According to some embodiments, the first interference cancellation technique may include post-decoder interference cancellation, and the second interference cancellation technique may include pre-decoder interference cancellation. In addition, interfering link IL decoder 3003 may be configured to decode the demodulated interfering link IL signal (generated by interfering link IL data demodulator 3001) to provide a decoded interfering link IL signal responsive to selecting post-decoder interference cancellation (i.e., responsive to selecting the first interference cancellation technique), and interfering link IL encoder 3021 may be configured to encode the decoded interfering link IL signal to provide an encoded interfering link IL signal responsive to selecting post-decoder interference cancellation. Interfering link IL regenerator 3025 may be configured to regenerate the interfering link IL signal from the encoded interfering link IL signal (generated by interfering link IL encoder 3021), for example, by modulating, spreading, filtering with interfering link channel estimates, etc. the encoded interfering link IL signal, to provide the interference cancellation IC signal 3032 responsive to selecting post-decoder interference cancellation. Interfering link IL regenerator 3025 may be configured to regenerate the demodulated interfering link IL signal (generated by interfering link IL data demodulator 3001 and/or symbol estimator 3005) to provide the interference cancellation signal 3032 without decoding the demodulated interfering link IL signal responsive to selecting pre-decoder interference cancellation. If symbol estimates are provided by symbol estimator 3005 applying hard decisions, for example, interfering link IL regenerator 3025 may be configured to spread, filter (with interfering link channel estimates), etc. the symbol estimates to regenerate an estimate of the interfering link IL signal (as perceived/received at target receiver 2005) that is provided as the interference cancellation signal 3032. Stated in other words, interfering link regenerator 3025 may be configured to perform different operations as needed to regenerate an estimate of the interfering link IL signal (as perceived/received at target receiver 2005) based on the interference cancellation technique selected and based on the source selected through switch 3023.

As discussed herein, interfering link IL regenerator 3025 may convert an encoded interfering link IL signal (generated by interfering link IL encoder 3021), soft/hard symbol estimates (generated by symbol estimator 3053), and/or a demodulated interfering link IL signal (generated by interfering link IL data demodulator 3001) to a digital baseband estimate of the interfering link IL signal (as perceived/received at target receiver 2005) to be used as interference cancellation IC signal 3032. Accordingly, interfering link IL regenerator 3025 may include operations of converting from a transmit bit sequence to symbols of a constellation (e.g., Quadrature Amplitude Modulation or QAM, Binary Phase Shift Keying or BPSK, etc.), spreading, filtering with the channel, etc., and operation of interfering link IL regenerator may vary as needed according to the input selected by switch 3023. Accordingly, interfering link IL channel and/or weight estimates may be provided from interfering link IL channel and weight estimator 3015 to interfering link IL modulator 3025.

As shown in FIG. 3, for example, interfering link IL data demodulator 3001 may be configured to generate the demodulated interfering link IL signal, and symbol estimator

3005 may be configured to generate symbol estimates and/or hard symbol decisions responsive to the demodulated interfering link IL signal. According to some embodiments, controller 3007 may use switch 3023 to select an output of symbol estimator 3005 or an output of interfering link IL encoder 3021 as an input to interfering link IL regenerator 3025, and the selection may be made responsive to the estimated quality of the interfering link IL signal (as perceived/received at target receiver 2005).

With relatively high quality reception of the interfering link IL signal (as perceived/received at target receiver 2005) allowing successful decoding and thus selection of post-decoder interference cancellation (e.g., SINR_I>SINR_d), controller 3007 may thus set switch 3023 to couple interfering link IL encoder 3021 to interfering link IL regenerator 3025 thereby decoupling symbol estimator 3005 and/or IL data demodulator 3001 from interfering link IL regenerator 3025. Accordingly, interference cancellation signal 3032 may be generated using post-decoder interference cancellation by demodulating the interfering link IL signal using interfering link IL data demodulator, decoding the demodulated interfering link IL signal using interfering link IL data decoder 3003, encoding the decoded interfering link IL signal using interfering link IL encoder 3021, and modulating, spreading, filtering (with interfering link IL channel estimates), etc. the encoded interfering link IL signal using interfering link IL regenerator 3025. By using decoding and encoding to generate the estimate of the interfering link IL signal, a power of interference cancellation may be increased.

With relatively low quality reception of the interfering link IL signal as perceived/received at target receiver 2005 (such that successful decoding may be unlikely) and thus selection of pre-decoder interference cancellation (e.g., SINR_I<SINR_d), controller 3007 may thus set switch 3023 to couple symbol estimator 3005 to interfering link IL regenerator 3025 thereby decoupling interfering link IL encoder from interfering link IL regenerator 3025. Accordingly, interference cancellation signal 3032 may be generated using pre-decoder interference cancellation by demodulating the interfering link IL signal using interfering link IL data demodulator, estimating symbols (using hard/soft estimates) of the interfering link IL signal using symbol estimator 3005, and spreading, filtering (using interference link IL channel estimates), etc. the estimated symbols using interfering link IL regenerator 3025 to generate a digital baseband estimate of the interfering link IL signal (as perceived/received at target receiver 2005). By omitting interfering link IL data decoding and encoding at interfering link IL data decoder 3003 and interfering link IL encoder 3021, processing overhead and/or power consumption may be reduced when a quality of the interfering link IL signal at receiver 2005 (as perceived/received at target receiver 2005) is not sufficiently high to justify decoding and encoding.

An output of interfering link IL regenerator 3025 (e.g., a digital baseband estimate of the interfering link IL signal as perceived/received at target receiver 2005) may be provided to switch 3031 which is also controlled by controller 3007. If either pre-decoder IC or post-decoder IC is selected by controller 3007, for example, switch 3031 may be configured to provide output of interfering link IL regenerator 3025 as interference cancellation signal 3032. According to some embodiments, a quality (e.g., SINR_I) of interfering link IL signal as perceived/received at target receiver 2005 may be so low that neither pre-decoder nor post-decoder IC is justified, in which case controller 3007 may control switch 3031 to provide an IC signal 3032 having zero (000) magnitude so that no interference cancellation is performed with respect to the interfering link IL signal. Stated in other words, an interfering link IL signal may be so weak as perceived/received at target receiver 2005 that sufficient demodulation (using interfering link IL data demodulator 3001) for interference cancellation is not feasible, in which case, pre-decoder and/or post-decoder interference cancellation of the interfering link IL signal may not be useful, effective, and/or feasible. Accordingly, processing capacity and/or power consumed by interfering link IL data decoder 3003, interfering link IL encoder 3021, symbol estimator 3005, and/or interfering link IL regenerator 3025 may be reduced. As used herein, selection of a zero magnitude (000) interference cancellation signal may be equivalent to omitting (or bypassing) interference cancellation (not shown in FIG. 3).

Elements/blocks of FIG. 3 are shown by way of illustration without limiting implementation of functionalities thereof. For example, switches 3023 and 3031 are shown separately, but functionalities thereof may be implemented in a single switch. Switch 3023, for example, may select between symbol estimator 3005 and interfering link IL encoder 3021, and a zero magnitude (000) output of interfering link IL regenerator 3025 may be effectively provided by controller 3007 turning interfering link IL regenerator 3025 off. Moreover, switch 3023 may be integrated with IL regenerator 3025, and/or elements/functionalities of IL regenerator may be provided on opposite sides of switch 3023. For example, a modulator element/functionality of IL regenerator 3025 may be provided between IL encoder 3021 and switch 3023, with spreading and filtering elements/functionalities of IL regenerator 3025 remaining between switches 3023 and 3031.

While symbol estimator 3005 is shown by way of example, symbol estimation may not be required so that an output of interfering link IL data demodulator 3001 may be provided directly to interfering link IL regenerator 3025 without hard/soft symbol estimation. According to still other embodiments, controller 3007 may control symbol estimator 3005 during pre-decoder interference cancellation to provide hard symbol decision estimates, soft symbol decision estimates, or no estimates (e.g., providing an output of interfering link IL data demodulator 3001 directly to interfering link IL regenerator 3025) responsive to the quality (e.g., SINR_I) of the interfering link IL signal as perceived/received at target receiver 2005. For example, symbol estimator 3005 may generate hard symbol estimates responsive to a relatively high quality of the interfering link IL signal (less than the threshold for post-decoder IC) as perceived/received at target receiver 2005, symbol estimator 3005 may generate soft symbol estimates responsive to a medium quality of the interfering link IL signal (less than the threshold for post-decoder IC) as perceived/received at target receiver 2005, and symbol estimator 3005 may be bypassed responsive to a relatively low quality of the interfering link IL signal (less than the threshold for post-decoder IC) as perceived/received at target receiver 2005. According to some embodiments, symbol estimator 3005 may generate hard decision symbol estimates without an explicit symbol manipulation stage by using signs of extracted soft bit values to generate corresponding constellation point labels that may be processed through IL regenerator 3025 to regenerate the digital baseband estimate of the interfering link signal (as perceived/received at target receiver 2005).

According to some embodiments, controller 3002 may be configured to determine an interfering link IL signal quality threshold (e.g., SINR_m) for demodulating the interfering link IL signal and to compare the estimated interfering link IL signal quality SINR_I (as perceived/received at target receiver 2005) with the threshold for demodulating the interfering link IL signal. As used herein, SINR_m may be defined as a least SINR for the interfering link signal allowing symbol estimator 3005 to provide reasonable hard decision symbol outputs for the given modulation.

Controller 3007, for example, may be configured to make these comparisons after determining that the estimated interfering link IL signal quality (as perceived/received at target receiver 2005) is less than the threshold for decoding (e.g., SINR_d), or controller 3007 may be configured to compare an estimated interfering link IL signal quality SINR_I (as perceived/received at target receiver 2005) with a threshold for decoding (e.g., SINR_d) after determining that the estimated interfering link IL signal quality (as perceived/received at target receiver 2005) exceeds the threshold for demodulating (e.g., SINR_m). Controller 3007 may be further configured to select pre-decoder interference cancellation responsive to the estimated interfering link IL signal quality (as perceived/received at target receiver 2005) exceeding the threshold for demodulating the interfering link IL signal (e.g., SINR_I>SINR_m), and to select demodulation without pre-decoder interference cancellation responsive to the estimated interfering link IL signal quality (as perceived/received at target receiver 2005) being less than the threshold for demodulating (e.g., SINR_I<SINR_m). Interfering link IL control channel demodulator and decoder 3017, for example, may be configured to provide a modulation and coding scheme MCS (e.g., including modulation and transport block size information) for the interfering link IL, and controller 3007 may be configured to determine the threshold for demodulating the interfering link IL signal (e.g., SINR_m) responsive to the MCS for the interfering link IL signal and/or look up tables. More particularly, SINR_m may be fetched from a pre-computed lookup table indexed by information obtained/derived from the interfering link control channel (e.g., modulation, etc.). In addition or in an alternative, controller 3007 may be configured to determine the threshold for demodulating the interfering link IL signal (e.g., SINR_m) responsive to the output of interfering link IL data demodulator 3001 and/or responsive to soft/hard symbol estimates provided by symbol estimator 3005. Note that, depending on the MCS applied on the interfering link IL, the SINR thresholds for successful demodulation (reliable hard decisions prior to decoding) and for successful decoding may have any relationship, e.g., SINR_d may be less than or greater than SINR_m.

Interfering link IL regenerator 3025 may be configured to spread, filter (with estimates of the interfering link IL channel), etc. the demodulated interfering link IL signal (generated by interfering link IL data demodulator 3001 and/or symbol estimator 3005) to provide the interference cancellation signal 3032 (as a digital baseband estimate of the interfering link IL signal as perceived/received at target receiver 2005) without decoding the demodulated interfering link IL signal responsive to selecting pre-decoder interference cancellation, and to provide an interference cancellation signal having zero magnitude (000) responsive to selecting target link TL data demodulation without pre-decoder interference cancellation. Switch 3031, for example, may be configured to select an output of interfering link IL regenerator 3025 as interference cancellation signal 3032 responsive to selecting pre-decoder interference cancellation, or to select zero magnitude (000) as interference cancellation signal 3032 responsive to selecting target link TL data demodulation without pre-decoder interference cancellation.

According to still further embodiments, interfering link IL demodulator 3001 may be configured to demodulate the interfering link IL signal to provide a demodulated interfering link IL signal, and interfering link IL decoder 3003 may be configured to decode the demodulated interfering link IL signal to provide a decoded interfering link IL signal. Moreover, controller 3007 may be configured to perform error detection/correction (e.g., CRC) on the decoded interfering link IL signal and to determine success/failure of the error detection/correction on the decoded interfering link IL signal. Controller 3007 may be configured to select post-decoder interference cancellation responsive to success of the error detection/correction (e.g., CRC) on the decoded interfering link IL signal, and to select pre-decoder interference cancellation responsive to failure of the error detection/correction on the decoded interfering link IL signal. Responsive to selecting post-decoder interference cancellation, interfering link IL encoder 3021 may be configured to encode the decoded interfering link IL signal to provide an encoded interfering link IL signal. Interfering link IL regenerator 3025 may be configured to modulate, spread, filter (with an estimate of the interfering link channel), etc. the encoded interfering link IL signal to provide the interference cancellation signal 3032 responsive to selecting post-decoder interference cancellation, and to spread, filter (with an estimate of the interfering link channel), etc. the demodulated interfering link IL signal to provide the interference cancellation signal 3032 responsive to selecting pre-decoder interference cancellation.

According to yet further embodiments, controller 3007 may be configured to select post-decoder interference cancellation responsive to success of the error detection/correction (e.g., CRC) of the decoded interfering link IL signal, and to select target link TL demodulation without interference cancellation responsive to failure of the error detection/correction on the decoded interfering link IL signal. Interfering link IL encoder 3021 may be configured to encode the decoded interfering link IL signal to provide an encoded interfering link IL signal responsive to selecting post-decoder interference cancellation. Interfering link IL regenerator 3025 may be configured to modulate, spread, filter (with an estimate of the interfering link channel), etc. the encoded interfering link IL signal to provide the interference cancellation signal responsive to selecting post-decoder interference cancellation, and to provide an interference cancellation signal having zero magnitude (000) responsive to selecting demodulation without post-decoder interference cancellation. Switch 3031 and/or elements/functionality thereof may be included in interfering link IL regenerator 3025 so that regenerator 3025 may be considered as selecting between an interference cancellation signal as an estimate of the interfering link IL signals (as perceived/received at target receiver 2005) and a zero magnitude interference cancellation signal. As used herein, selection of a zero magnitude interference cancellation signal may be equivalent to omitting interference cancellation.

Operations of communications device 2001 and receiver 2005 thereof will now be discussed with reference to the flow charts of FIGS. 4-16.

FIG. 4, for example, illustrates operations of selecting an interference cancellation technique for a target link TL signal responsive to an estimated quality of an interfering link IL signal (e.g., SINR_I) as perceived/received at target receiver 2005 where the target link TL signal is received in a received signal also including the interfering link IL signal. Interfering link IL estimator 3002 may estimate at block 4001 a quality of the interfering link IL signal in the received signal to provide an estimated interfering link IL signal quality (e.g., SINR_I) as perceived/received at target receiver 2005. One of a plurality of interference cancellation techniques (also referred to as interference cancellation modes) may be selected at block 4003 responsive to the estimated interfering link IL signal quality (e.g., SINR_I), and an interference cancellation signal may be generated at block 4005 using the selected one of the plurality of interference cancellation techniques. Information of the interference cancellation signal 3032 may be incorporated in the received digital baseband signal 3014 at block 4007, and the received digital baseband signal may be demodulated at block 4009 to provide a demodulated target link TL signal responsive to incorporating information of the interference cancellation signal in the received digital baseband signal. For example, incorporating information of the IC signal in the received signal at block 4007 may include combining the interference cancellation signal and the received signal to provide an interference reduced target link TL signal, and demodulating at block 4009 may include demodulating the interference reduced target link TL signal. As shown in FIG. 3, for example, combiner 3051 may be used to combine the IC signal 3032 and received digital baseband signal 3014 (e.g., to subtract IC signal 3032 from received digital baseband signal 3014) so that a component of the interfering link IL signal in the received digital baseband signal 3014 is reduced before demodulation at target link TL data demodulator 3053. Alternatively, according to some other embodiments incorporating information of the interference cancellation signal in the received signal at block 4007 may include modifying demodulator metrics of target link TL data demodulator 3053 responsive to the interference cancellation signal, and demodulating at block 4009 may include demodulating the received signal using the modified demodulator metrics. Output of interfering link IL estimator 3002, for example, may be used to modify operations of target link TL data demodulator 3053 and/or target link TL channel and weight estimator 3041. The demodulated target link TL signal is then decoded at block 4011 to provide a target link TL bit stream.

Figure 7:
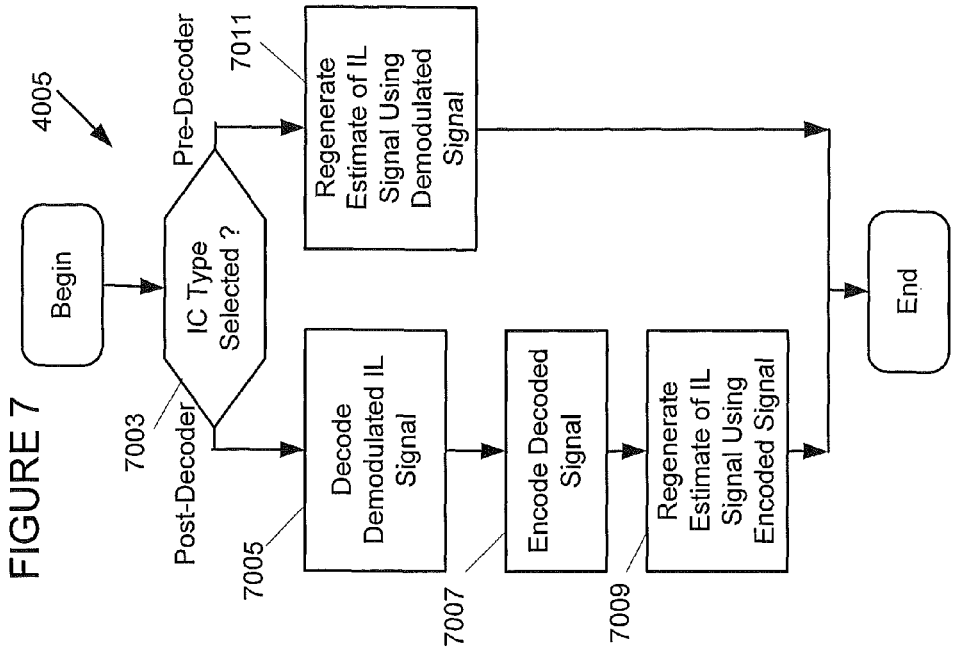
Figure 6:
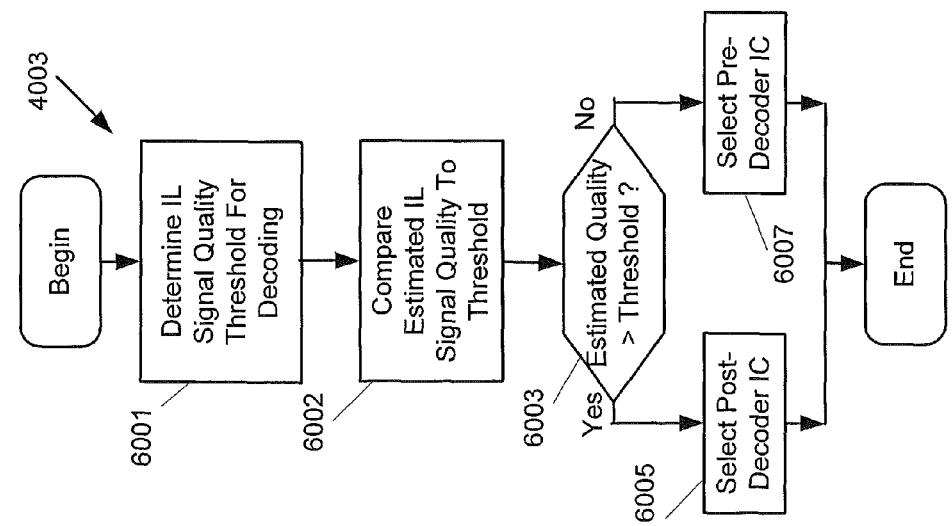

Operations of blocks 4001, 4003, and 4005 of FIG. 4 are discussed in greater detail with respect to FIGS. 5, 6, and 7 according to some embodiments where a selection between post-decoder and pre-decoder interference cancellation is made responsive to comparing an estimated interfering link IL signal quality (e.g., SINR_I) with a threshold for decoding (e.g., SINR_d). As shown in FIG. 5, estimating the quality of the interfering link IL signal as perceived/received at target receiver 2005 at block 4001 may include demodulating the interfering link IL signal at the receiving device to provide a demodulated interfering link IL signal at block 5001, and the quality of the interfering link IL signal (e.g., SINR_I) as perceived/received at target receiver 2005 may be estimated at block 5003 responsive to the demodulated interfering link IL signal.

Operations of selecting one of the plurality of the interference cancellation techniques of block 4003 may be provided according to some embodiments as shown for example in FIG. 6. More particularly, an interfering link IL signal quality threshold for decoding (e.g., SINR_d) the interfering link IL signal may be determined at block 6001. This determination may, for example, include providing a modulation and coding scheme MCS (e.g., including modulation and transport block size information) for the interfering link IL signal, and determining the threshold for decoding responsive to the modulation and coding scheme MCS for the interfering link IL signal. The estimated interfering link IL signal quality (as perceived/received at target receiver 2005) may be compared with the interfering link IL signal quality threshold (e.g., SINR_d) at blocks 6002 and 6003. Responsive to the estimated interfering link IL signal quality exceeding the threshold for decoding (e.g., SINR_I>SINR_d) at block 6003, a first one of the plurality of interference cancellation techniques may be selected at block 6005. Responsive to the estimated interfering link IL signal quality being less than the threshold for decoding (e.g., SINR_I<SINR_d), a second one of the plurality of interference cancellation techniques may be selected at block 6007.

Examples of operations of generating an interference cancellation signal at block 4005 will be discussed in greater detail with respect to FIG. 7 according to some embodiments. The first interference cancellation technique may include post-decoder interference cancellation, and the second interference cancellation technique may include pre-decoder interference cancellation. Responsive to selecting post-decoder interference cancellation at block 7003, the demodulated interfering link IL signal may be decoded at block 7005 to provide a decoded interfering link IL signal, the decoded interfering link IL signal may be encoded at block 7007 to provide an encoded interfering link IL signal, and the encoded interfering link IL signal may be used to regenerate an estimate of the interfering link IL signal at block 7011 (e.g., using modulation, spreading, filtering, etc.) to provide the interference cancellation signal. Responsive to selecting pre-decoder interference cancellation at block 7003, the demodulated interfering link IL signal may be used to regenerate an estimate of the interfering link IL signal (as perceived/received at target receiver 2005) at block 7011 (e.g., using spreading, filtering, etc.) to provide the interference cancellation signal without decoding the demodulated interfering link IL signal.

If communications device 2001 is a wireless terminal, the MCS (e.g., including modulation and transport block size information) may be provided by receiving (demodulating and decoding) a control channel associated with the interfering link signal as perceived/received at target receiver 2005 (e.g., an HS-SCCH from the base station transmitting the interfering link signal), and obtaining the MCS (e.g., including modulation and transport block size information) for the interfering link IL signal from the control channel. If communications device 2001 is a base station, the MCS may be available to the base station as an element of the communications network without requiring receipt of a control channel. In FIG. 1A, for example, the base station will have the MCS for both of the TL and IL wireless terminals with which it is communicating.

Operations of blocks 4001, 4003, and 4005 of FIG. 4 are discussed in greater detail with respect to FIGS. 5, 8, and 9 according to some other embodiments where a selection between pre-decoder interference cancellation and demodulation without pre-decoder interference cancellation is made responsive to comparing an estimated interfering link IL signal quality SINR_I (as perceived/received at target receiver 2005) with a threshold for demodulation (e.g., SINR_m). As shown in FIG. 5, estimating the quality of the interfering link IL signal (as perceived/received at target receiver 2005) at block 4001 may include demodulating the interfering link IL signal to provide a demodulated interfering link IL signal at block 5001, and the quality of the interfering link IL signal (SINR_I) as perceived/received at target receiver 2005 may be estimated at block 5003 responsive to the demodulated interfering link IL signal.

Selecting one of the plurality of interference cancellation techniques at block 4003 responsive to the estimated interfering link IL signal quality (as perceived/received at target receiver 2005) may be performed as shown in FIG. 8. An interfering link IL signal quality threshold for demodulating (e.g., SINR_m) the interfering link IL signal may be determined at block 9001. This determination may, for example, involve providing a modulation and coding scheme MCS for the interfering link IL signal, and the threshold for demodulating (SINR_m) may be determined using the modulation and coding scheme MCS for the interfering link IL signal and/or lookup tables. The estimated interfering link IL signal quality (e.g., SINR_I) as perceived/received at target receiver 2005 may be compared with the threshold for demodulating the interfering link IL signal at blocks 9003 and 9005. Responsive to the estimated interfering link IL signal quality exceeding the threshold for demodulating the interfering link IL signal (e.g., SINR_I>SINR_m), pre-decoder interference cancellation may be selected at block 9007. Responsive to the estimated interfering link IL signal quality being less than the threshold for demodulating (e.g., SINR_I<SINR_m), demodulation without pre-decoder interference cancellation may be selected at block 9011.

Operations of generating the interference cancellation signal at block 4005 using the selected one of the plurality of interference cancellation techniques may be provided according to some embodiments as discussed in greater detail below with respect to FIG. 9. Responsive to selecting pre-decoder interference cancellation at block 10003, the demodulated interfering link IL signal may be used to regenerate an estimate of the interfering link IL signal at block 10005 (e.g., spreading, filtering, etc.) to provide the interference cancellation signal without decoding the demodulated interfering link IL signal. Responsive to selecting demodulation without pre-decoder interference cancellation, an interference cancellation signal having zero magnitude may be provided at block 10007. As noted above, providing an interference cancellation signal having zero magnitude may the same as omitting interference cancellation.

If communications device 2001 is a wireless terminal, the MCS may be provided by receiving (demodulating and decoding) a control channel associated with the interfering link signal as perceived/received at target receiver 2005 (e.g., an HS-SCCH from the base station transmitting the interfering link signal), and obtaining the MCS for the interfering link IL signal from the control channel. According to other embodiments, elements of the MCS (e.g., modulation and code allocation information) may be estimated based on an output of demodulating the interfering link IL signal, for example, if the MCS cannot be obtained over a control channel. If communications device 2001 is a base station, the MCS may be available to the base station as an element of the communications network without requiring receipt of a control channel. In FIG. 1A, for example, the base station will have the MCS for both of the TL and IL wireless terminals with which it is communicating.

Figure 10:
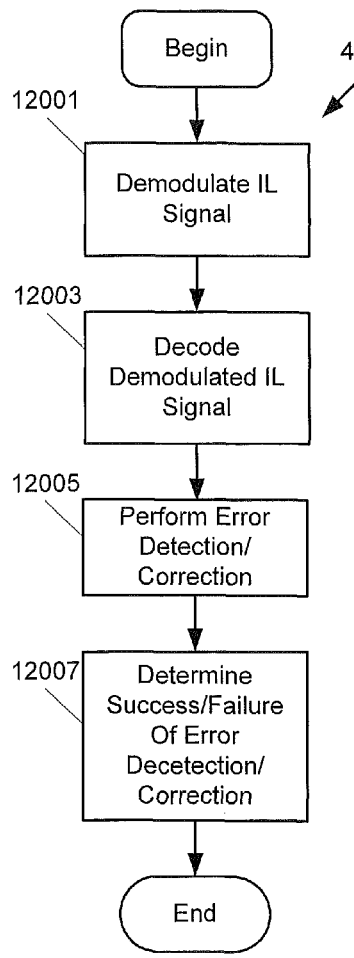
Figure 11:
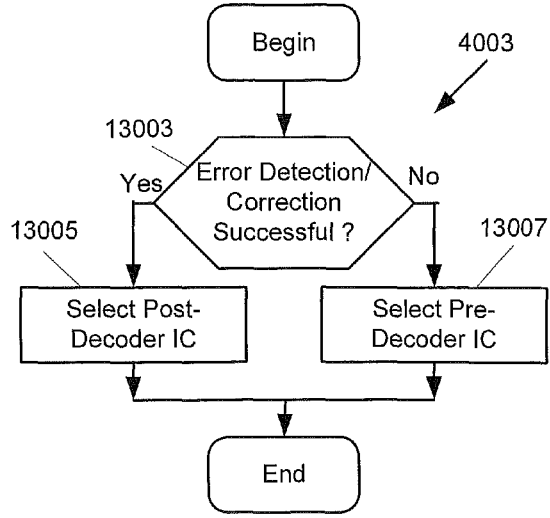
Figure 12:
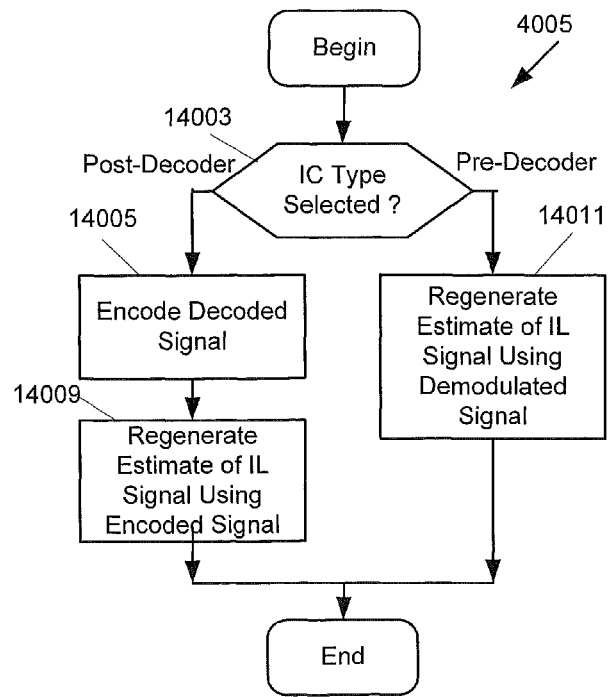

Operations of blocks 4001, 4003, and 4005 of FIG. 4 are discussed in greater detail with respect to FIGS. 10, 11, and 12 according to still other embodiments where a selection between post-decoder and pre-decoder interference cancellation is made responsive to a result of error detection/correction (e.g., CRC). Operations of estimating a quality of the interfering link IL signal (e.g., SINR_I) as perceived/received at target receiver 2005 at block 4001 according to some embodiments are shown in FIG. 10. More particularly, the interfering link IL signal may be demodulated at block 12001 to provide a demodulated interfering link IL signal, and decoding (12003) the demodulated interfering link IL signal may be decoded at block 12003 to provide a decoded interfering link IL signal. Error detection/correction (e.g., CRC) may be performed on the decoded interfering link IL signal at block 12005, and success/failure of the error detection/correction (e.g., CRC) on the decoded interfering link IL signal may be determined at block 12007.

Operations of selecting one of the plurality of interference cancellation techniques of block 4003 according to some embodiments are shown in FIG. 11. Responsive to success of the error detection/correction (e.g., CRC) on the decoded interfering link IL signal at block 13003, post-decoder interference cancellation may be selected at block 13005. Responsive to failure of the error detection/correction (e.g., CRC) on the decoded interfering link IL signal at block 13003, pre-decoder interference cancellation may be selected at block 13007.

Operations of generating an interference cancellation signal of block 4005 according to some embodiments are shown in FIG. 12. Responsive to selecting post-decoder interference cancellation at block 14003, the decoded interfering link IL signal may be encoded at block 14005 to provide an encoded interfering link IL signal, and the encoded interfering link IL signal may be used to regenerate an estimate of the interfering link IL signal (as perceived/received at target receiver 2005) at block 14009 (e.g., using modulation, spreading, filtering, etc.) to provide the interference cancellation signal. Responsive to selecting pre-decoder interference cancellation at block 14003, the demodulated interfering link IL signal may be used to regenerate an estimate of the interfering link IL signal (as perceived/received at target receiver 2005) at block 14011 (e.g., using spreading, filtering, etc.) to provide the interference cancellation signal without encoding the IL signal.

Figure 14:
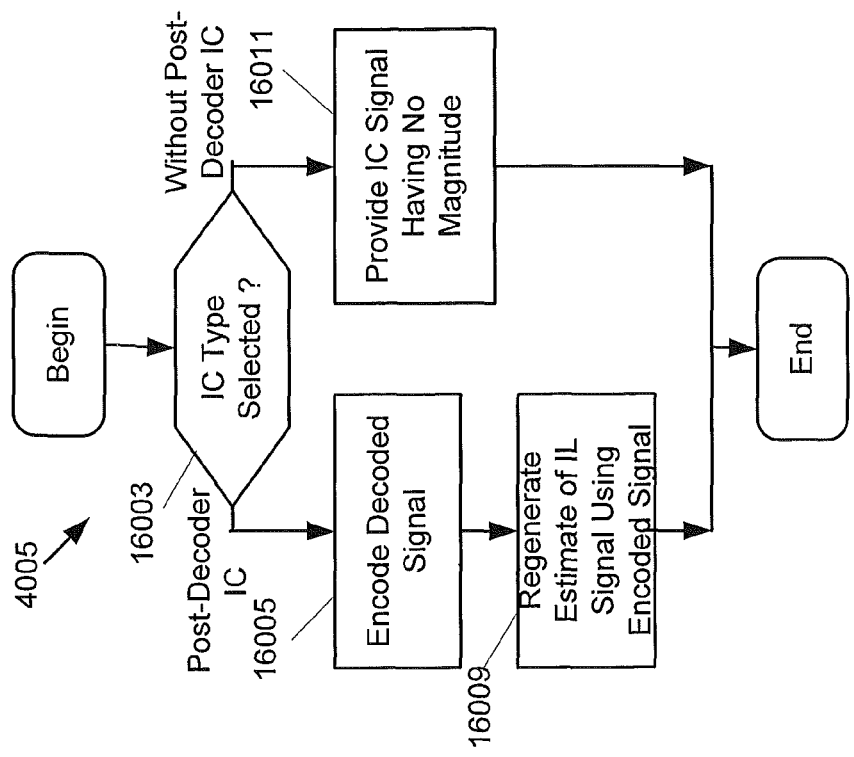
Figure 13:
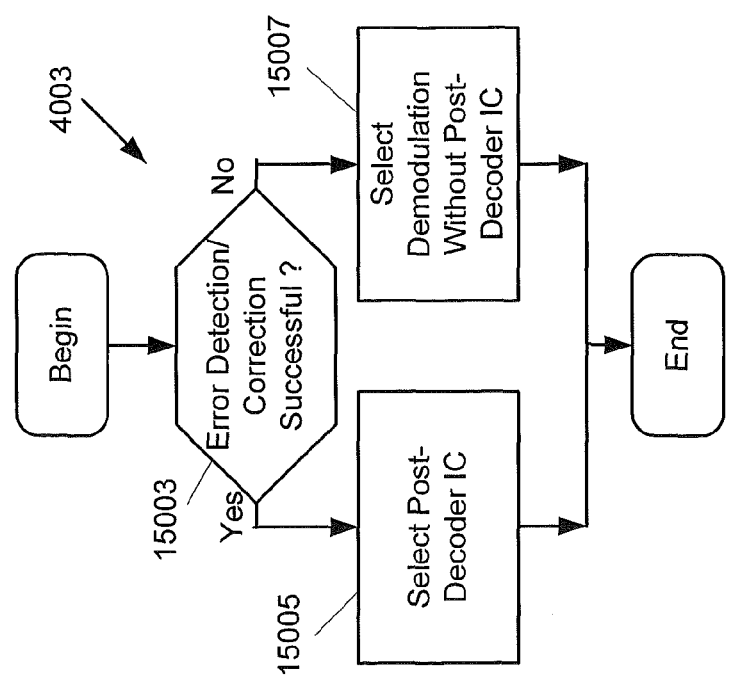

Operations of blocks 4001, 4003, and 4005 of FIG. 4 are discussed in greater detail with respect to FIGS. 10, 13, and 14 according to some embodiments where a selection between post-decoder interference cancellation and demodulation without post-decoder interference cancellation is made responsive to a result of error detection/correction. Operations of estimating a quality of the interfering link IL signal (as perceived/received at target receiver 2005) at block 4001 according to some embodiments may be the same as those discussed above with respect to FIG. 10.

Operations of selecting one of the plurality of interference cancellation techniques of block 4003 according to some embodiments are shown in FIG. 13. Responsive to success of the error detection/correction on the decoded interfering link IL signal at block 15003, post-decoder interference cancellation may be selected at block 15005. Responsive to failure of the error detection/correction on the decoded interfering link IL signal, demodulation of the target link TL signal without post-decoder interference cancellation may be selected at block 15007.

Operations of selecting one of the plurality of interference cancellation techniques of block 4003 according to some embodiments are shown in FIG. 14. Responsive to selecting post-decoder interference cancellation at block at block 16003, the decoded interfering link IL signal may be encoded at block 16005 to provide an encoded interfering link IL signal, and the encoded interfering link IL signal may be used to regenerate an estimate of the interfering link IL signal (as perceived/received at target receiver 2005) at block 16009 (e.g., using modulation, spreading, filtering, etc.) to provide the interference cancellation signal. Responsive to selecting demodulation without post-decoder interference cancellation, an interference cancellation signal having zero magnitude may be provided at block 16011.

FIGS. 4-14 illustrate embodiments of interference cancellation where a receiver selects an interference cancellation technique responsive to a quality (e.g., SINR_I) of an interfering link IL signal (as perceived/received at target receiver 2005). Various of these embodiments may be implemented independently or different embodiments may be combined as discussed below, for example, with respect to FIGS. 15 and 16.

Figure 15:
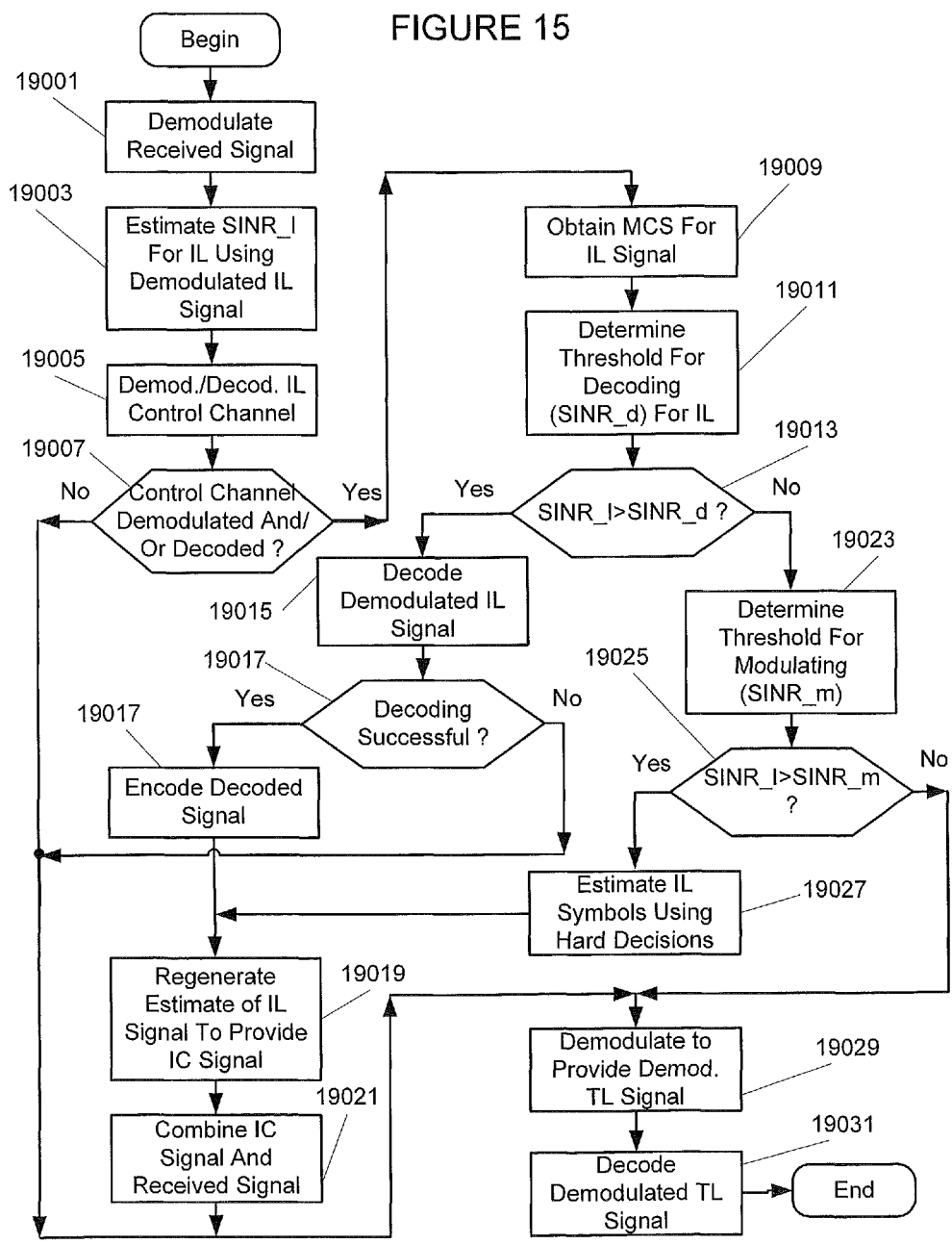

FIG. 15 is a flow chart illustrating examples of interference cancellation combining elements of embodiments discussed above. At block 19001, interfering link IL estimator 3002 may demodulate received digital baseband signal 3014 (using estimates of the IL channel and/or weights) to provide a demodulated interfering link IL data signal (e.g., providing IL data symbol estimates), for example, using interfering link IL data demodulator 3001, and interfering link IL SINR estimator 3019 may estimate a Signal-to-Interference-and-Noise-Ratio for the interfering link IL signal (SINR_I) as perceived/received at target receiver 2005 at block 19003. SINR_I may thus serve as an estimate of a quality of the interfering link IL data signal as perceived/received at target receiver 2005. At block 19005, interfering link IL control channel demodulator and decoder 3017 may attempt to demodulate and/or decode a control channel (e.g., an HS-SCCH) for the interfering link IL transmitter. If the interfering link IL control channel can be demodulated and/or decoded at blocks 19005 and 19007, controller 3007 may obtain a modulation and coding scheme MCS for the interfering link IL data signal at block 19009 from the demodulated and/or decoded interfering link IL control channel, and controller 3007 may use the MCS information to determine a threshold SINR_d for decoding the interfering link IL data signal at block 19011. In other words, SINR_d may be a minimum Signal-to-Interference-and-Noise-Ratio of the interfering link IL data signal that is required to decode the interfering link IL signal, also referred to as a signal quality threshold for decoding. SINR_d, for example, may be determined using a look-up-table based on the MCS for the interfering link IL data signal.

Operations of blocks 19005 and 19007, for example, may be performed if the target and interfering link signals are downlink signals transmitted by a base station(s) to different wireless terminals. A target wireless terminal, for example, may not normally have access to a modulation and coding scheme MCS for an interfering link signal, and the target wireless terminal may thus obtain the MCS for the interfering link signal by receiving the control channel for the interfering link signal. If the target and interfering signals are uplink signals transmitted by different wireless terminals to a same base station or to different base stations, the base station may already have access to modulation and coding schemes MCSs for both wireless terminals so that operations of blocks 19005 and 19007 may be omitted and so that the operations of FIG. 15 may skip directly from block 19003 to 19009.

At block 19013, controller 3007 may compare SINR_I (provided as an estimate of a quality of the interfering link IL signal as perceived/received at target receiver 2005) with SINR_d (provided as a signal quality threshold for decoding). If a quality of the interfering link IL signal (represented by SINR_I) exceeds a threshold for decoding (represented by SINR_d) such that SINR_I is greater than SINR_d at block 9013, interfering link IL data decoder 3003 may decode the demodulated interfering link IL signal at block 19015. If interfering link IL data signal is successfully decoded at block 19017 (e.g., if the decoded interfering link IL data signal passes error detection/correction, such as a cyclical redundancy check or CRC), interfering link IL encoder 3021 may encode the decoded interfering link IL signal at block 19017, and interfering link IL regenerator 3025 may modulate, spread, filter, etc. the encoded interfering link IL signal to regenerate a digital baseband estimate of the IL signal that is provided interference cancellation signal 3032 at block 19019. Combiner 3051 may then combine the IC signal and the digital baseband signal 3014 at block 19021. For example, combiner 3051 may subtract the IC signal from the digital baseband signal 3014 to provide an interference reduced digital baseband signal for the target link. Target link TL data demodulator 3053 may then demodulate the interference reduced digital baseband signal for the target link TL signal at block 19029, and target link TL data decoder 3055 may decode the demodulated target link TL signal at block 19031 to provide the target link TL bit stream.

If the interfering link IL data signal is not successfully decoded at block 19017, target link TL data demodulator 3053 may demodulate received digital baseband signal 3014 to provide a demodulated target link TL signal at block 19029 without performing interference cancellation. Stated in other words, IC signal 3032 may be provided with zero magnitude. Target link TL data decoder 3055 may then decode the demodulated target link TL signal at block 19031 to provide the target link TL bit stream.

If a quality of the interfering link IL signal (represented by SINR_I) as perceived/received at target receiver 2005 is less than a threshold for decoding (represented by SINR_d) such that SINR_I<SINR_d at block 9013, controller 3007 may determine a threshold SINR_m for modulating the interfering link IL signal using the MCS derived from the interfering link IL control channel at block 19023. If the quality of the interfering link IL data signal (SINR_I) is greater than the threshold for modulating (SINR_m) at block 19025, symbol estimator 3005 may estimate interfering link IL symbols using hard symbol decisions at block 19027, and regenerator 3025 may spread, filter, etc. the estimated symbols to regenerate a digital baseband estimate of the IL signal to be used as IC signal 3032 at block 19019. IC signal 3032 may be combined with digital baseband signal 3014 at block 19021 to provide an interference reduced digital baseband target link TL signal. Target link TL data demodulator may then demodulate the interference reduced digital baseband target link TL signal at block 19029, and target link TL data decoder 3055 may decode the demodulated target link TL signal to generate the target link TL bit stream at block 19031.

If the quality of the interfering link IL data signal (SINR_I) is less than the threshold for modulating (SINR_m) at block 19025, target link TL data demodulator 3053 may demodulate the received digital baseband signal 3014 to provide a demodulated target link TL signal at block 19029 without performing interference cancellation. Stated in other words, IC signal 3032 may be provided with zero magnitude. Target link TL data decoder 3055 may then decode the demodulated target link TL signal at block 19031 to provide the target link TL bit stream.

Similarly, if the interfering link IL control channel cannot be demodulated and/or decoded at blocks 19005 and 19007, target link TL data demodulator 3053 may demodulate the received digital baseband signal to provide a demodulated target link TL signal at block 19029 without performing interference cancellation. Stated in other words, IC signal 3032 may be provided with zero magnitude. Target link TL data decoder 3055 may then decode the demodulated target link TL signal at block 19031 to provide the target link TL bit stream.

Figure 16:
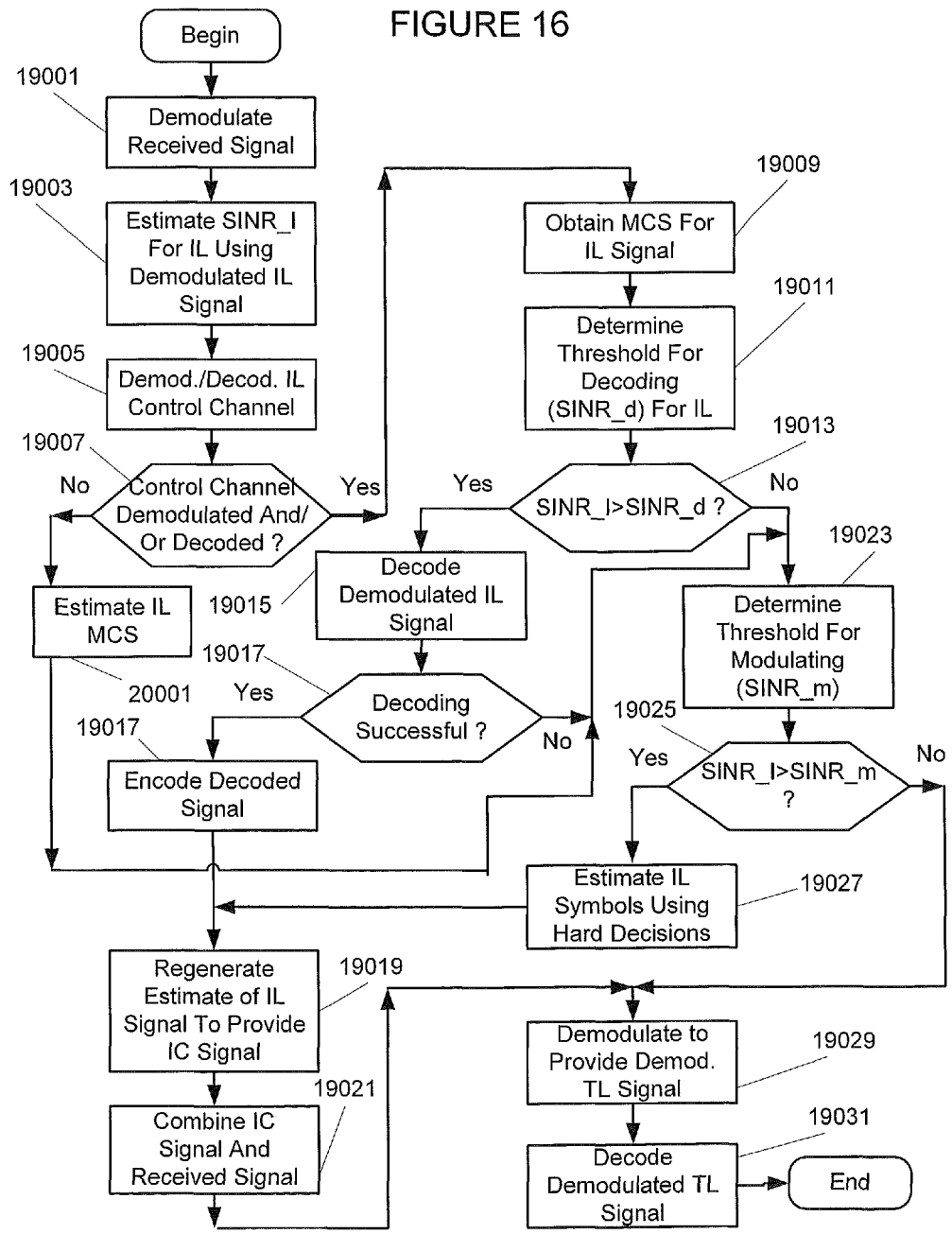

The flow chart of FIG. 16 is similar to that of FIG. 15, with the addition of block 20001 and with the rerouting of operations from the "No" outputs of blocks 19007 and 19025. Reference numbers of FIG. 16 that are the same as those of FIG. 15 are used to indicate the same operations. Accordingly, further discussion of operations of FIG. 16 that have already been discussed with respect FIG. 15 may be omitted for the sake of conciseness.

At block 19007 (for downlink signals), controller 3007 may determine if the control channel of the interfering link IL transmitter can be decoded or not as discussed above with respect to FIG. 15. If the control channel can be decoded, the modulation and coding scheme MCS for the interfering link IL signal may be obtained from the control channel as discussed above with respect to block 19009 of FIG. 15. On the other hand, if the control channel cannot be decoded at block 19007, controller 3007 may estimate the MCS (or elements thereof) for the interfering link IL signal using an output of interfering link IL data demodulator 3001 at block 20001. The estimate of the MCS (or elements thereof) for the interfering link IL signal may then be used by controller 3007 to determine the threshold for modulating (SINR_m) at block 19023. If communications device 2001 is a base station so that uplink signals are being received, operations of blocks 19005, 19007, and 20001 may be omitted, and operations may proceed directly from block 19003 to block 19009.

According to some embodiments, if the estimated quality of the interfering link IL signal (SINR_I) as perceived/received at target receiver 2005 is greater than the threshold for modulating (SINR_m) determined based on the estimated MCS information at block 19025, symbol estimator 3005 may estimate interfering link IL symbols using hard decisions at block 19027. According to some other embodiments, symbol estimator 3005 may ignore a Quadrature Amplitude Modulation (QAM) order and treat all symbols as Quadrature Phase Shift Key (QPSK) symbols so that only the quadrant of the QAM constellation (i.e., the sign of the raw symbol estimate in each dimension) is effectively detected. Accordingly, residual interfering link IL signal energy may remain after interference cancellation, but the interference may be suppressed to some degree and issues relating to robustness due to incorrect QAM order detection may be reduced. According to still other embodiments, symbol estimator 3005 may generate soft symbol estimates (expected symbol values) using soft bit values. Such soft symbol estimates may not belong to a discrete symbol alphabet (or constellation) and may have a property that the symbol estimate magnitude is lower when the original demodulated raw symbols have a low SINR and low reliability. This lower magnitude at lower SINR_may add robustness to the interference cancellation because the magnitude of the interference cancellation IC signal may be made insignificant when the raw symbols are excessively noisy.

The resulting symbol estimates may be spread, filtered, etc. at block 19019 using interfering link IL regenerator 3025 to regenerate a digital baseband estimate of the IL signal to be provided as the interference cancellation IC signal. The interference cancellation IC signal 3032 may be combined with the received digital baseband signal 3014 using combiner 3051 at block 19021, and the resulting interference reduced baseband signal may be demodulated using target link TL data demodulator 3053 at block 19029 and decoded using target link TL data decoder at block 19031 to generate the target link bit stream.

At block 19025, if the estimated quality of the interfering link IL signal (SINR_I) as received/perceived at target receiver 2005 is less than the threshold for modulating (SINR_m) determined based on the estimated MCS (from block 20001), the received digital baseband signal 3014 may be demodulated using target link TL data demodulator 3053 at block 19029 without performing interference cancellation. Stated in other words, an interference cancellation 3032 signal having zero magnitude (000) may be combined with (e.g., subtracted from) the received digital baseband signal 3014 at combiner 3051. The output of target link TL data demodulator 3053 may then be decoded using target link TL data decoder 3055 at block 19031 to provide the target link bit stream.

Similar operations may occur if the interfering link IL signal is not successfully decoded at blocks 19015 and 19017. If the interfering link IL signal is successfully decoded at block 19015, the decoded signal may be encoded at block 19017 and processed as discussed above with respect to blocks 19019 and 19021 to provide an interference reduced received digital baseband signal before demodulating and decoding the target link TL signal at blocks 19029 and 19031. If the interfering link IL signal is not successfully decoded at block 19017, controller 3007 may determine the threshold for modulating the interfering link IL signal (SINR_m) at block 19023. In this case, the threshold for modulating the interfering link IL signal may be determined using the MCS for the interfering link IL signal previously obtained at block 19009, for example, using the demodulated/decoded interfering link IL control channel from blocks 19005 and 19007.

If the estimated quality of the interfering link IL signal (SINR_I) as perceived/received at target receiver 2005 is greater than the threshold for modulating (SINR_m) determined based on the MCS received over the interfering link IL control channel at block 19025, symbol estimator 3005 may estimate interfering link IL symbols using hard decisions at block 19027, and the resulting estimates may be spread, filtered, etc. at block 19019 using interfering link IL regenerator 3025 to regenerate a digital baseband estimate of the IL signal that is provided as the interference cancellation IC signal 3032. The interference cancellation signal may be combined with the received digital baseband signal 3014 using combiner 3051 at block 19021, and the resulting interference reduced digital baseband signal may be demodulated using target link TL data demodulator 3053 at block 19029 and decoded using target link TL data decoder at block 19031 to provide the target link bit stream.

At block 19025, if the estimated quality of the interfering link IL signal (SINR_I) as perceived/received at target receiver 2005 is less than the threshold for modulating (SINR_m) determined based on the estimated MCS (from block 20001), the received digital baseband signal 3014 may be demodulated using target link TL data demodulator 3053 at block 19029 without performing interference cancellation. Stated in other words, an interference cancellation 3032 signal having zero magnitude (000) may be combined with (e.g., subtracted from) the received digital baseband signal at combiner 3051. The output of target link TL data demodulator 3053 may then be decoded using target link TL data decoder 3055 at block 19031.

According to embodiments discussed herein, receiver 2005 of communications device 2001 may estimate a quality of interfering link IL signal (e.g., SINR_I) as perceived/received at target receiver 2005. Receiver 2005 may use this estimated quality of the interfering link IL signal to select an interference cancellation IC technique used to reduce a component of this interfering link IL signal in a received digital baseband signal that is demodulated and decoded to generate a target link TL bit stream corresponding to a target link TL signal intended for the receiver 2005. In some embodiments a modulation and coding scheme MCS for the interfering link IL signal may be obtained from a control channel corresponding to the interfering link IL signal, and/or a MCS (or elements thereof) may be estimated for the interfering link IL based on a result of demodulating the interfering link IL signal (e.g., if the corresponding control channel cannot be demodulated and/or decoded). Receiver 2005 can use elements of the MCS for the interfering link IL signal (e.g., received over a control channel, estimated based on demodulating, obtained directly for uplink signals, etc.) to determine interfering link IL signal quality thresholds (e.g., SINR_m, SINR_d, etc.) for different interference cancellation techniques/modes available to receiver 2005 to provide improved interference cancellation efficiency. As discussed above, the estimated quality of the interfering link IL signal SINR_I (as perceived/received at target receiver 2005) may be compared with one or more of the interfering link IL signal quality thresholds (e.g., SINR_m, SINR_d, etc.), and an interference cancellation technique/mode providing a more effective interference cancellation effect for the given interfering link IL signal conditions (as perceived/received at target receiver 2005) based on the comparison(s) may be selected/used.

Interference cancelling receiver 2005 may be implemented as a base station receiver receiving uplink UL communications (from wireless terminals) or as a wireless terminal receiver receiving downlink communications (from a base station). As a base station receiver, receiver 2005 may receive target link TL uplink signals from a target link TL wireless terminal, and receiver 2005 may receive interfering link IL uplink signals from an interfering link IL wireless terminal (e.g., as discussed above with respect to FIG. 1A). As a base station receiver, receiver 2005 may have access to the MCS for the interfering link IL because the base station (or other adjacent base stations in the same network) is (are) the intended recipient of both uplink target and interfering link signals. Accordingly, operations of receiving, demodulating, and/or decoding an interfering link IL control channel and/or estimating elements of MCS for an interfering link IL signal and decisions relating thereto may be omitted for uplink signals received at a base station.

As a wireless terminal receiver, receiver 2005 may receive target link TL and interfering link IL downlink signals from the same or different base stations (e.g., as discussed above with respect to FIGS. 1B and 1C). As a wireless terminal, however, receiver 2005 is not an intended recipient of the IL signal. Accordingly, receiver 2005 may receive a control channel relating to the interfering link IL signal to obtain a modulation and coding scheme MCS for the interfering link IL signal and/or receiver 2005 may estimate elements of MCS for the interfering link IL. Where the target and interfering link signals are both transmitted by a same base station, for example, receiver 2005 may receive a same control channel providing MCSs for both target and interfering links. Where the target and interfering links are transmitted by different base stations, however, receiver 2005 may be unable to receive a control channel providing MCS for the interfering link IL signal.

Embodiments of interference cancellation receivers and/or methods discussed above may be implemented for uplink and/or downlink communications according to different communications standards. According to some embodiments, interference cancellation may be implemented for uplink and/or downlink data communications according to standards such as the High Speed Packet Access (HSPA) standard. For example, interference cancellation disclosed herein may be implemented in wireless terminal receivers for downlink data communications according to the High Speed Downlink Packet Access (HSDPA) standard. In these embodiments, target and interfering link signals may be provided as High Speed Downlink Data Channels (HS-PDSCH), and MCS information for interfering link IL signals may be received over a High Speed Shared Control Channel (HS-SCCH) associated with the interfering link IL signal.

Hybrid receiver structures and methods according to some embodiments discussed herein may thus provide improved interference mitigation (and thus improved geometry factors) using available resources over different/changing channel and/or interference conditions. By selecting an appropriate interference cancellation technique responsive to a quality of the interfering link signal (as perceived/received at target receiver 2005), Inter-Symbol Interference ISI suppression may be improved for any ISI on the target link signal because interference due to the interfering link signal (as perceived/received at target receiver 2005) may be significantly suppressed without using a spatial degree of freedom of the underlying linear receiver. Accordingly, all spatial degrees of freedom may remain available for ISI suppression.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of receiving a target link signal at a receiving device wherein the target link signal is received in a received signal also including an interfering link signal, the method comprising:
    estimating a quality of the interfering link signal in the received signal at the receiving device to provide an estimated interfering link signal quality, wherein estimating the quality of the interfering link signal comprises estimating a signal-to-interference-and-noise ratio of the interfering link signal;
    selecting one of a plurality of interference cancellation techniques responsive to the estimated interfering link signal quality;
    generating an interference cancellation signal using the selected one of the plurality of interference cancellation techniques, wherein the interference cancellation signal comprises an estimate of the interfering link signal;
    combining the interference cancellation signal comprising the estimate of the interfering link signal and the received signal to provide an interference reduced target link signal;
    responsive to combining the interference cancellation signal and the received signal, demodulating the interference reduced target link signal to provide a demodulated target link signal; and
    decoding the demodulated target link signal to provide a target link bit stream.

2. The method of claim 1, wherein estimating the quality of the interfering link signal comprises:
    demodulating the interfering link signal at the receiving device to provide a demodulated interfering link signal;
    decoding the demodulated interfering link signal to provide a decoded interfering link signal; and
    performing error detection/correction on the decoded interfering link signal; and
    determining success/failure of the error detection/correction on the decoded interfering link signal.

3. The method of claim 2,
    wherein selecting one of the plurality of interference cancellation techniques comprises:
        responsive to success of the error detection/correction on the decoded interfering link signal, selecting post-decoder interference cancellation, and
        responsive to failure of the error detection/correction on the decoded interfering link signal, selecting pre-decoder interference cancellation, and
    wherein generating the interference cancellation signal using the selected one of the plurality of interference techniques comprises:
        responsive to selecting post-decoder interference cancellation, encoding the decoded interfering link signal to provide an encoded interfering link signal, and providing the interference cancellation signal using the encoded interfering link signal, and responsive to selecting pre-decoder interference cancellation, providing the interference cancellation signal using the demodulated interfering link signal.

4. The method of claim 2,
wherein selecting one of the plurality of plurality of interference cancellation techniques comprises:
responsive to success of the error detection/correction on the decoded interfering link signal, selecting post-decoder interference cancellation, and
responsive to failure of the error detection/correction on the decoded interfering link signal, selecting demodulation without post-decoder interference cancellation, and
wherein generating the interference cancellation signal using the selected one of the plurality of interference techniques comprises:
responsive to selecting post-decoder interference cancellation, encoding the decoded interfering link signal to provide an encoded interfering link signal, and providing the interference cancellation signal using the encoded interfering link signal, and
responsive to selecting demodulation without post-decoder interference cancellation, providing an interference cancellation signal having zero magnitude.

5. A method of receiving a target link signal at a receiving device wherein the target link signal is received in a received signal also including an interfering link signal, the method comprising:
estimating a quality of the interfering link signal in the received signal at the receiving device to provide an estimated interfering link signal quality, wherein estimating the quality of the interfering link signal comprises:
demodulating the interfering link signal at the receiving device to provide a demodulated interfering link signal, and
estimating the quality of the interfering link signal responsive to the demodulated interfering link signal;
selecting one of a plurality of interference cancellation techniques responsive to the estimated interfering link signal quality;
generating an interference cancellation signal using the selected one of the plurality of interference cancellation techniques;
incorporating information of the interference cancellation signal in the received signal;
responsive to incorporating information of the interference cancellation signal in the received signal, demodulating the received signal to provide a demodulated target link signal; and
decoding the demodulated target link signal to provide a target link bit stream.

6. The method of claim 5, wherein selecting one of the plurality of interference cancellation techniques comprises:
determining an interfering link signal quality threshold for decoding the interfering link signal;
comparing the estimated interfering link signal quality with the interfering link signal quality threshold,
responsive to the estimated interfering link signal quality exceeding the threshold for decoding, selecting a first one of the plurality of interference cancellation techniques, and
responsive to the estimated interfering link signal quality being less than the threshold for decoding, selecting a second one of the plurality of interference cancellation techniques.

7. The method of claim 6,
wherein the first interference cancellation technique comprises post-decoder interference cancellation, wherein the second interference cancellation technique comprises pre-decoder interference cancellation,
wherein generating the interference cancellation signal using the selected one of the plurality of interference cancellation techniques comprises:
responsive to selecting post-decoder interference cancellation, decoding the demodulated interfering link signal to provide a decoded interfering link signal, encoding the decoded interfering link signal to provide an encoded interfering link signal, and providing the interference cancellation signal using the encoded interfering link signal, and
responsive to selecting pre-decoder interference cancellation, providing the interference cancellation signal using the demodulated interfering link signal without decoding the demodulated interfering link signal.

8. The method of claim 6, wherein determining the interfering link signal quality threshold for decoding the interfering link signal comprises:
providing a modulation and coding scheme for the interfering link signal; and
determining the threshold for decoding responsive to the modulation and coding scheme for the interfering link signal.

9. The method of claim 5,
wherein selecting one of the plurality of interference cancellation techniques responsive to the estimated interfering link signal quality comprises:
determining an interfering link signal quality threshold for demodulating the interfering link signal;
comparing the estimated interfering link signal quality with the threshold for demodulating the interfering link signal,
responsive to the estimated interfering link signal quality exceeding the threshold for demodulating the interfering link signal, selecting pre-decoder interference cancellation, and
responsive to the estimated interfering link signal quality being less than the threshold for demodulating, selecting demodulation without pre-decoder interference cancellation; and
wherein generating the interference cancellation signal using the selected one of the plurality of interference cancellation techniques comprises:
responsive to selecting pre-decoder interference cancellation, providing the interference cancellation signal using the demodulated interfering link signal without decoding the demodulated interfering link signal, and
responsive to selecting demodulation without pre-decoder interference cancellation, providing an interference cancellation signal having zero magnitude.

10. The method of claim 9, wherein determining the interfering link signal quality threshold for demodulating the interfering link signal comprises:
providing a modulation and coding scheme for the interfering link signal, and
determining the threshold for demodulating responsive to the modulation and coding scheme for the interfering link signal.

11. The method of claim 5 wherein incorporating information of the interference cancellation signal in the received signal comprises combining the interference cancellation signal and the received signal to provide an interference reduced target link signal, and wherein demodulating comprises demodulating the interference reduced target link signal.

12. The method of claim 5 wherein incorporating information of the interference cancellation signal in the received signal comprises modifying demodulator metrics responsive to the interference cancellation signal, and wherein demodulating comprises demodulating the received signal using the modified demodulator metrics.

13. A receiver configured to receive a target link signal wherein the target link signal is received in a received signal also including an interfering link signal, the receiver comprising:
   an interfering link estimator configured to estimate a quality of the interfering link signal in the received signal to provide an estimated interfering link signal quality wherein estimating the quality of the interfering link signal comprises estimating a signal-to-interference-and-noise ratio of the interfering link signal, configured to select one of a plurality of interference cancellation techniques responsive to the estimated interfering link signal quality, and configured to generate an interference cancellation signal using the selected one of the plurality of interference cancellation techniques, wherein the interference cancellation signal comprises an estimate of the interfering link signal;
   a demodulator configured to combine the interference cancellation signal comprising the estimate of the interfering link signal and the received signal to provide an interference reduced target link signal and configured to demodulate the interference reduced target link signal to provide a demodulated target link signal; and
   a decoder configured to decode the demodulated target link signal to provide a target link bit stream.

14. The receiver of claim 13, wherein the interfering link estimator comprises:
   an interfering link demodulator configured to demodulate the interfering link signal to provide a demodulated interfering link signal,
   an interfering link decoder configured to decode the demodulated interfering link signal to provide a decoded interfering link signal, and
   a controller configured to perform error detection/correction on the decoded interfering link signal, and configured to determine success/failure of the error detection/correction on the decoded interfering link signal.

15. The receiver of claim 14, wherein the controller is configured to select post-decoder interference cancellation responsive to success of the error detection/correction on the decoded interfering link signal, and configured to select pre-decoder interference cancellation responsive to failure of the error detection/correction on the decoded interfering link signal, wherein the interfering link estimator further comprises, comprises:
   an interfering link encoder configured to encode the decoded interfering link signal to provide an encoded interfering link signal responsive to selecting post-decoder interference cancellation, and
   an interfering link regenerator configured to provide the interference cancellation signal using the encoded interfering link signal responsive to selecting post-decoder interference cancellation, and configured to provide the interference cancellation signal using the demodulated interfering link signal responsive to selecting pre-decoder interference cancellation.

16. The receiver of claim 14, wherein the controller is configured to select post-decoder interference cancellation responsive to success of the error detection/correction on the decoded interfering link signal, and configured to select demodulation without post-decoder interference cancellation responsive to failure of the error detection/correction on the decoded interfering link signal, and wherein the interfering link estimator further comprises:
   an interfering link encoder configured to encode the decoded interfering link signal to provide an encoded interfering link signal responsive to selecting post-decoder interference cancellation, and
   an interfering link regenerator configured to provide the interference cancellation signal using the encoded interfering link signal responsive to selecting post-decoder interference cancellation, and configured to provide an interference cancellation signal having zero magnitude responsive to selecting demodulation without post-decoder interference cancellation.

17. A receiver configured to receive a target link signal wherein the target link signal is received in a received signal also including an interfering link signal, the receiver comprising:
   an interfering link estimator configured to estimate a quality of the interfering link signal in the received signal to provide an estimated interfering link signal quality, configured to select one of a plurality of interference cancellation techniques responsive to the estimated interfering link signal quality, and configured to generate an interference cancellation signal using the selected one of the plurality of interference cancellation techniques wherein the interfering link estimator comprises:
      an interfering link demodulator configured to demodulate the interfering link signal to provide a demodulated interfering link signal, and
      an interfering link SINR estimator configured to estimate the quality of the interfering link signal responsive to the demodulated interfering link signal;
   a demodulator configured to incorporate information of the interference cancellation signal in the received signal and configured to demodulate the received signal to provide a demodulated target link signal; and
   a decoder configured to decode the demodulated target link signal to provide a target link bit stream.

18. The receiver of claim 17, wherein the interfering link estimator comprises:
   a controller configured to determine an interfering link signal quality threshold for decoding the interfering link signal, configured to compare the estimated interfering link signal quality with the interfering link signal quality threshold, configured to select a first one of the plurality of interference cancellation techniques responsive to the estimated interfering link signal quality exceeding the threshold for decoding, and configured to select a second one of the plurality of interference cancellation techniques responsive to the estimated interfering link signal quality being less than the threshold for decoding.

19. The receiver of claim 18 wherein the first interference cancellation technique comprises post-decoder interference cancellation, wherein the second interference cancellation technique comprises pre-decoder interference cancellation, and wherein the interfering link estimator further comprises:
   an interfering link decoder configured to decode the demodulated interfering link signal to provide a decoded interfering link signal responsive to selecting post-decoder interference cancellation,
   an interfering link encoder configured to encode the decoded interfering link signal to provide an encoded interfering link signal responsive to selecting post-decoder interference cancellation, and
   an interfering link regenerator wherein the interfering link regenerator is configured to provide the interference cancellation signal using the encoded interfering link signal responsive to selecting post-decoder interference cancellation, and wherein the interfering link regenerator is configured to provide the interference cancellation signal using the demodulated interfering link signal without decoding the demodulated interfering link signal responsive to selecting pre-decoder interference cancellation.

20. The receiver of claim 18, wherein the interfering link estimator comprises:
an interfering link control channel demodulator and decoder configured to provide a modulation and coding scheme for the interfering link signal,
wherein the controller is configured to determine the threshold for decoding responsive to the modulation and coding scheme for the interfering link signal.

21. The receiver of claim 17, wherein the interfering link estimator comprises:
a controller configured to determine an interfering link signal quality threshold for demodulating the interfering link signal, configured to compare the estimated interfering link signal quality with the threshold for demodulating the interfering link signal, configured to select pre-decoder interference cancellation responsive to the estimated interfering link signal quality exceeding the threshold for demodulating the interfering link signal, and configured to select demodulation without pre-decoder interference cancellation responsive to the estimated interfering link signal quality being less than the threshold for demodulating, and a interfering link regenerator configured to provide the interference cancellation signal using the demodulated interfering link signal without decoding the demodulated interfering link signal responsive to selecting pre-decoder interference cancellation, and configured to provide an interference cancellation signal having zero magnitude responsive to selecting demodulation without pre-decoder interference cancellation.

22. The receiver of claim 21, wherein the interfering link estimator comprises:
an interfering link demodulator configured to provide a modulation and coding scheme for the interfering link signal,
wherein the controller is configured to determine the threshold for demodulating responsive to the modulation and coding scheme for the interfering link signal.

23. The receiver of claim 17 wherein the demodulator comprises a combiner configured to incorporate information of the interference cancellation signal in the received signal by combining the interference cancellation signal and the received signal to provide an interference reduced target link signal, and wherein the demodulator is further configured to demodulate the interference reduced target link signal.

24. The receiver of claim 17 wherein the demodulator is configured to incorporate information of the interference cancellation signal in the received signal by modifying demodulator metrics responsive to the interference cancellation signal, and wherein the demodulator is configured to demodulate the received signal using the modified demodulator metrics.

* * * * *

UNITED STATES PATENT AND TRADEMARK OFFICE
CERTIFICATE OF CORRECTION

PATENT NO. : 8,767,895 B2
APPLICATION NO. : 13/165090
DATED : July 1, 2014
INVENTOR(S) : Reial It is certified that error appears in the above-identified patent and that said Letters Patent is hereby corrected as shown below:

In the Specification:

In Column 5, Line 23, delete "channel" and insert -- channel. --, therefor.

In Column 7, Line 14, delete "combiner 3031" and insert -- combiner 3051 --, therefor.

In Column 7, Lines 58-59, delete "High Speed Downlink Data Channel (HS-PDSCH)" and insert -- High Speed Physical Downlink Shared Channel (HS-PDSCH) --, therefor.

In Column 12, Line 62, delete "controller 3002" and insert -- controller 3007 --, therefor.

In Column 23, Line 64, delete "High Speed Downlink Data Channel (HS-PDSCH)," and insert -- High Speed Physical Downlink Shared Channel (HS-PDSCH), --, therefor.

In the Claims:

In Column 27, Line 5, in Claim 4, delete "plurality of plurality of" and insert -- plurality of --, therefor.

Signed and Sealed this
Thirty-first Day of March, 2015

Michelle K. Lee
*Director of the United States Patent and Trademark Office*